(12) United States Patent
Tomoda et al.

(10) Patent No.: US 8,524,824 B2
(45) Date of Patent: Sep. 3, 2013

(54) RESIN COMPOSITION

(75) Inventors: Takuya Tomoda, Chiyoda-ku (JP);
Yoshihisa Shinagawa, Chiyoda-ku (JP);
Shinichi Soda, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 721 days.

(21) Appl. No.: 12/309,807

(22) PCT Filed: Jul. 30, 2007

(86) PCT No.: PCT/JP2007/065313
§ 371 (c)(1),
(2), (4) Date: Nov. 17, 2009

(87) PCT Pub. No.: WO2008/016157
PCT Pub. Date: Feb. 7, 2008

(65) Prior Publication Data
US 2010/0113660 A1    May 6, 2010

(30) Foreign Application Priority Data

Aug. 1, 2006 (JP) ................ 2006-209578
Aug. 29, 2006 (JP) ................ 2006-231873
Dec. 27, 2006 (JP) ................ 2006-351767
Dec. 27, 2006 (JP) ................ 2006-351768

(51) Int. Cl.
*C08L 69/00* (2006.01)
*C08K 3/34* (2006.01)
*C08K 5/42* (2006.01)
*C08K 7/00* (2006.01)

(52) U.S. Cl.
USPC ................ 524/458; 524/520; 523/201

(58) Field of Classification Search
USPC ................ 524/458, 520; 523/201
See application file for complete search history.

(56) References Cited

U.S. PATENT DOCUMENTS

| | | | | |
|---|---|---|---|---|
| 6,133,360 A | * | 10/2000 | Barren et al. | 524/431 |
| 6,613,820 B2 | | 9/2003 | Fujiguchi et al. | |
| 2004/0116588 A1 | | 6/2004 | Lin et al. | |
| 2004/0143068 A1 | | 7/2004 | Honda et al. | |
| 2005/0148719 A1 | | 7/2005 | An et al. | |
| 2005/0154103 A1 | * | 7/2005 | Shibuya et al. | 524/284 |

FOREIGN PATENT DOCUMENTS

| | | | |
|---|---|---|---|
| JP | 3066012 | | 5/2000 |
| JP | 2000-297220 | | 10/2000 |
| JP | 2002302597 A | * | 10/2002 |
| JP | 2002348457 A | * | 12/2002 |
| JP | 3469391 | | 9/2003 |
| JP | 2004083901 A | * | 3/2004 |
| JP | 2005048072 A | * | 2/2005 |
| JP | 2005-263908 | | 9/2005 |
| JP | 2006-509902 | | 3/2006 |
| JP | 2006117860 A | * | 5/2006 |
| JP | 2007/055305 | | 5/2007 |
| JP | 2007-154173 | | 6/2007 |
| WO | 00/39210 | | 7/2000 |
| WO | 02/090440 | | 11/2002 |

* cited by examiner

Primary Examiner — Kelechi Egwim
(74) Attorney, Agent, or Firm — Wenderoth, Lind & Ponack, L.L.P.

(57) ABSTRACT

To provide a resin composition comprising an aromatic polycarbonate resin and having excellent appearance, impact strength, thermal stability, hydrolysis resistance, and flame retardancy.

The present invention relates to a resin composition comprising (A) 75 to 99.98 wt % of an aromatic polycarbonate resin (component A), (B) 0.01 to 5 wt % of a mixture of polytetrafluoroethylene particles and an organic polymer (component B) and (C) 0.01 to 20 wt % of a flame retardant (component C), wherein the sodium metal ion content of the component B (excluding sodium metal ion contained in the polytetrafluoroethylene particles) is 10 ppm or less, and molded articles therefrom.

17 Claims, No Drawings

RESIN COMPOSITION

TECHNICAL FIELD

The present invention relates to a resin composition comprising an aromatic polycarbonate. More specifically, it relates to a resin composition which is excellent in appearance, impact strength, thermal stability and hydrolysis resistance.

BACKGROUND ART

An aromatic polycarbonate resin is used in a wide variety of fields because it has transparency and excellent flame retardancy, heat resistance and strength. However, as electronic and electric equipment parts and OA-related parts are becoming thinner, to use it in these fields, the flame retardancy of the aromatic polycarbonate resin must be further improved. High flame retardancy, for example, UL 94 V-0 rating (standards of Underwriters Laboratories of the U.S.) is often required for resins which are used in these fields. To obtain high flame retardancy, it is important that the dripping of a resin should not occur at the time of its combustion.

Polytetrafluoroethylene (may be abbreviated as PTFE) is generally known as a dripping inhibitor. However, as the secondary agglomeration of PTFE readily occurs due to the influence of static electricity, when it is mixed with an aromatic polycarbonate resin, a feed failure to the cylinder of an extruder readily occurs. Owing to its low dispersibility, it worsen the appearance of the obtained resin composition and reduces the impact strength of the composition. To improve the dispersibility of PTFE, there are proposed various methods for mixing PTFE with an organic polymer (refer to patent documents 1 to 4).

Meanwhile, molding conditions are becoming severer. For example, the injection speed is becoming faster and the molding temperature is becoming higher. Therefore, an aromatic polycarbonate resin composition which has thermal stability high enough to stand severe molding conditions is desired. That is, it is desired that an undesirable phenomenon such as the discoloration of a molded product by heat history at the time of molding does not occur under severe molding conditions. At the same time, excellent hydrolysis resistance is required for electronic and electric equipment parts and OA-related parts in order to enhance the durability of a product.

Therefore, a resin composition which improves the dispersibility in an aromatic polycarbonate resin of PTFE, is excellent in appearance, impact resistance, thermal stability and hydrolysis resistance and does not drip is desired.

Patent document 1 proposes to improve the dispersibility of PTFE by mixing it with an organic polymer. However, the obtained resin composition is not satisfactory in terms of thermal stability and hydrolysis resistance. Patent documents 2 to 4 improve the dispersibility of PTFE in the same way but it cannot be said that the obtained resin compositions are satisfactory in terms of hydrolysis resistance and also impact strength.

It is known that thermal stability is improved by adding a phosphorus-, phenol- or sulfur-based heat stabilizer to an aromatic polycarbonate resin. However, when these heat stabilizers are added, the hydrolysis resistance of the obtained resin composition greatly deteriorates.

(patent document 1) Japanese Patent No. 3,469,391
(patent document 2) JP-A 2000-297220
(patent document 3) Japanese Patent No. 3,066,012
(patent document 4) JP-A 2005-263908

DISCLOSURE OF THE INVENTION

It is an object of the present invention to provide a resin composition which comprises an aromatic polycarbonate resin and is excellent in appearance, impact strength, thermal stability, hydrolysis resistance and flame retardancy.

The inventors of the present invention have studied how to improve the thermal stability and hydrolysis resistance of a resin composition which contains a mixture of PTFE and an organic polymer in an aromatic polycarbonate resin. As a result, they have found that sodium metal ion contained in the mixture has a great influence upon the thermal stability and hydrolysis resistance of the resin composition and have accomplished the present invention.

The present invention provides a resin composition which comprises (A) 75 to 99.98 wt % of an aromatic polycarbonate resin (component A), (B) 0.01 to 5 wt % of a mixture of polytetrafluoroethylene particles and an organic polymer (component B), and (C) 0.01 to 20 wt % of a flame retardant (component C), wherein the sodium metal ion content (excluding sodium metal ion contained in the polytetrafluoroethylene particles) of the component B is 10 ppm or less. The present invention also provides a molded product of the resin composition.

BEST MODE FOR CARRYING OUT THE INVENTION

The present invention will be described in detail hereinunder.

(Component A: Aromatic Polycarbonate Resin)

The aromatic polycarbonate resin used as the component A in the present invention is obtained by reacting a diphenol with a carbonate precursor. Examples of the reaction include interfacial polymerization, melt ester interchange, solid-phase ester interchange of a carbonate prepolymer and the ring opening polymerization of a cyclic carbonate compound.

Typical examples of the diphenol used herein include hydroquinone, resorcinol, 4,4'-biphenol, 1,1-bis(4-hydroxyphenyl)ethane, 2,2-bis(4-hydroxyphenyl)propane (generally called "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyophenyl)sulfoxide, bis(4-hdyroxyphenyl)sulfone, bis(4-hydroxyphenyl)ketone, bis(4-hydroxyphenyl)ester, bis(4-hdyroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred, and bisphenol A is particularly preferred and commonly used from the viewpoint of impact resistance.

In the present invention, special aromatic polycarbonates manufactured by using other diphenols maybe used as the component A, besides the aromatic polycarbonates obtained from bisphenol A (BPA) as the diphenol, which are general-purpose aromatic polycarbonates.

For example, 4,4'-(m-phenylenediisopropylidene)diphenol (may be abbreviated as "BPM" hereinafter), 1,1-bis(4-hydroxyphenyl)cyclohexane, 1,1-bis (4-hydroxyphenyl)-3,3, 5-trimethylcyclohexane (may be abbreviated as "Bis-TMC" hereinafter), 9,9-bis(4-hydroxyphenyl)fluorene and 9,9-bis(4-hydroxy-3-methylphenyl)fluorene (may be abbreviated as "BCF" hereinafter) may be used as part or all of the diphenol component. Aromatic polycarbonates (homopolymers or copolymers) obtained from the above diphenols are suitable for use in fields in which the requirements for stability to dimensional change by water absorption and form stability are very strict. A diphenol other than BPA is used in an amount of preferably 5 mol % or more, particularly preferably 10 mol % or more of the whole diphenol component constituting the aromatic polycarbonate.

Particularly when high stiffness and excellent hydrolysis resistance are required, the component A constituting the resin composition is particularly preferably one of the following copolycarbonates (1) to (3).

(1) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of BCF based on 100 mol % of the diphenol component constituting the aromatic polycarbonate.

(2) A copolycarbonate which comprises 10 to 95 mol % (preferably 50 to 90 mol %, more preferably 60 to 85 mol %) of BPA and 5 to 90 mol % (preferably 10 to 50 mol %, more preferably 15 to 40 mol %) of BCF based on 100 mol % of the diphenol component constituting the aromatic polycarbonate.

(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of Bis-TMC based on 100 mol % of the diphenol component constituting the aromatic polycarbonate.

These special aromatic polycarbonates may be used alone or in combination of two or more. Or, they may be mixed with a commonly used bisphenol A type aromatic polycarbonate before use.

The manufacturing processes and characteristics properties of these special aromatic polycarbonates are described in detail, for example, in JP-A 6-172508, JP-A 8-27370, JP-A 2001-55435 and JP-A 2002-117580.

Out of the above aromatic polycarbonates, aromatic polycarbonates whose water absorption coefficient and Tg (glass transition temperature) have been adjusted to the following ranges by controlling their compositions have high hydrolysis resistance and excellent resistance to warping after molding and are therefore particularly suitable for use in fields in which form stability is required.

(i) an aromatic polycarbonate having a water absorption coefficient of 0.05 to 0.15%, preferably 0.06 to 0.13% and a Tg of 120 to 180° C., or (ii) an aromatic polycarbonate having a Tg of 160 to 250° C., preferably 170 to 230° C. and a water absorption coefficient of 0.10 to 0.30%, preferably 0.13 to 0.30%, more preferably 0.14 to 0.27%.

The water absorption coefficient of an aromatic polycarbonate is a value obtained by measuring the moisture content of a disk-like specimen having a diameter of 45 mm and a thickness of 3.0 mm after the specimen is immersed in water at 23° C. for 24 hours in accordance with ISO62-1980. Tg (glass transition temperature) is a value measured with a differential scanning calorimeter (DSC) in accordance with JIS K7121.

The carbonate precursor is a carbonyl halide, diester carbonate or haloformate, as exemplified by phosgene, diphenyl carbonate and dihaloformates of a diphenol.

For the production of an aromatic polycarbonate from a diphenol and a carbonate precursor by interfacial polymerization, a catalyst, a terminal capping agent and an antioxidant for preventing the oxidation of the diphenol may be optionally used. In the present invention, the aromatic polycarbonate may be a branched aromatic polycarbonate resin obtained by copolymerizing a polyfunctional aromatic compound having 3 or more functional groups, a polyester carbonate resin obtained by copolymerizing an aromatic or aliphatic (including alicyclic) dicarboxylic acid, a copolycarbonate resin obtained by copolymerizing a dihydric alcohol (including an alicyclic alcohol), or a polyester carbonate resin obtained by copolymerizing the dicarboxylic acid and the dihydric alcohol. It may also be a mixture of two or more obtained aromatic polycarbonate resins.

The branched polycarbonate resin can provide dripping preventing ability to the resin composition of the present invention. Examples of the polyfunctional compound having 3 or more functional groups used in the branched polycarbonate resin include phloroglucin, phloroglucide, trisphenols such as 4,6-dimethyl-2,4,6-tris(4-hydroxyphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The constituent unit derived from the polyfunctional compound in the branched polycarbonate accounts for 0.01 to 1 mol %, preferably 0.05 to 0.9 mol %, particularly preferably 0.05 to 0.8 mol % based on 100 mol % of the total of the constituent unit derived from the diphenol and the constituent unit derived from the polyfunctional compound.

Particularly in the case of melt ester interchange, a branched structural unit may be produced as a by-product. The amount of this branched structural unit is 0.001 to 1 mol %, preferably 0.005 to 0.9 mol %, particularly preferably 0.01 to 0.8 mol % based on 100 mol % of the total of the constituent unit derived from the diphenol and the branched structural unit. The proportion of the branched structure can be calculated by $^1$H-NMR measurement. The aliphatic dicarboxylic acid is preferably α,Ω-dicarboxylic acid. Preferred examples of the aliphatic dicarboxylic acid include linear saturated aliphatic dicarboxylic acids such as sebacic acid (decanedioic acid), dodecanedioic acid, tetradecanedioic acid, octadecanedioic acid and icosanedioic acid; and alicyclic dicarboxylic acids such as cyclohexanedicarboxylic acid. The dihydric alcohol is preferably an alicyclic diol such as cyclohexane dimethanol, cyclohexane diol or tricyclodecane dimethanol.

Further, a copolymer of an aromatic polycarbonate and a polyorganosiloxane obtained by copolymerizing a polyorganosiloxane unit may also be used.

Reactions such as interfacial polymerization, melt ester interchange, the solid-phase ester interchange of a carbonate prepolymer and the ring opening polymerization of a cyclic carbonate compound for the manufacture of the aromatic polycarbonate resin of the present invention are well known by various documents and patent publications.

To manufacture the resin composition of the present invention, the viscosity average molecular weight (M) of the aromatic polycarbonate resin (component A) is not particularly limited but preferably 10,000 to 50,000, more preferably 14,000 to 30,000, much more preferably 14,000 to 24,000.

An aromatic polycarbonate resin having a viscosity average molecular weight lower than 10,000 may have low mechanical properties. Meanwhile, a resin composition obtained from an aromatic polycarbonate resin having a viscosity average molecular weight higher than 50,000 may be inferior in fluidity at the time of injection molding.

The aromatic polycarbonate resin may be obtained by mixing an aromatic polycarbonate having a viscosity average molecular weight outside the above range. Especially an aromatic polycarbonate resin having a viscosity average molecular weight higher than the above range (50,000) has improved enthropic elasticity. As a result, it develops high moldability in gas assist molding which may be used to mold a reinforced resin material into a structural member or foam molding. The improvement of moldability is better than that of the above branched polycarbonate. As a more preferred example, an aromatic polycarbonate resin (component A-1) (may be referred to as "high molecular weight component-containing aromatic polycarbonate resin" hereinafter) which consists of an aromatic polycarbonate resin (component A-1-1) having a viscosity average molecular weight of 70,000 to 300,000 and an aromatic polycarbonate resin (component A-1-2) having a viscosity average molecular weight of 10,000 to 30,000 and has a viscosity average molecular weight of 16,000 to 35,000 may also be used as the component A.

In the aromatic polycarbonate resin (component A-1), the molecular weight of the component A-1-1 is preferably 70,000 to 200,000, more preferably 80,000 to 200,000, much more preferably 100,000 to 200,000, particularly preferably 100,000 to 160,000. The molecular weight of the component A-1-2 is preferably 10,000 to 25,000, more preferably 11,000 to 24,000, much more preferably 12,000 to 24,000, particularly preferably 12,000 to 23,000.

The aromatic polycarbonate resin (component A-1) can be obtained by mixing together the components A-1-1 and A-1-2 in various ratios to adjust its molecular weight to a predetermined range. The amount of the component A-1-1 is preferably 2 to 40 wt %, more preferably 3 to 30 wt %, much more preferably 4 to 20 wt %, particularly preferably 5 to 20 wt % based on 100 wt % of the component A-1.

To prepare the component A-1, (1) a method in which the components A-1-1 and A-1-2 are polymerized independently and mixed together, (2) a method in which an aromatic polycarbonate resin showing a plurality of polymer peaks in a molecular weight distribution chart measured by GPC is manufactured in the same system as in the method disclosed by JP-A 5-306336 to satisfy the conditions of the component A-1 of the present invention, and (3) a method in which the aromatic polycarbonate resin obtained by the above manufacturing method (2) and the component A-1-1 and/or the component A-1-2 manufactured separately are mixed together may be employed.

The viscosity average molecular weight (M) in the present invention is calculated based on the following equation from the specific viscosity ($\eta$sp) of a solution containing 0.7 g of an aromatic polycarbonate dissolved in 100 ml of methylene chloride at 20° C. which is obtained with an Ostwald viscometer based on the following equation.

Specific viscosity ($\eta sp$)=$(t-t_0)/t_0$ [$t_0$ is a time (seconds) required for the dropping of methylene chloride and t is a time (seconds) required for the dropping of a sample solution]

$\eta_{sp}/c=[\eta]+0.45\times[\eta]^2 c$ ([$\eta$] represents an intrinsic viscosity)

$[\eta]=1.23\times10^{-4}M^{0.83}$ c=0.7

The viscosity average molecular weight of the aromatic polycarbonate resin in the resin composition of the present invention is calculated as follows. That is, the composition is mixed with methylene chloride in a weight ratio of 1:20 to 1:30 to dissolve soluble matter contained in the composition. The soluble matter is collected by filtration with cerite. The solvent contained in the obtained solution is then removed. A solid obtained after the removal of the solvent is fully dried to obtain a solid component which can dissolve in methylene chloride. The specific viscosity of a solution containing 0.7 g of the solid dissolved in 100 ml of methylene chloride at 20° C. is obtained to calculate its viscosity average molecular weight (M) like above.

(Component B: Mixture of Polytetrafluoroethylene Particles and an Organic Polymer)

The mixture (component B) contains polytetrafluoroethylene particles and an organic polymer. The mixture (component B) is obtained by polymerizing an organic monomer in the presence of polytetrafluoroethylene particles. Therefore, the polytetrafluoroethylene particles are coated with the organic polymer.

(Polytetrafluoroethylene)

Polytetrafluoroethylene is particulate with a diameter of preferably 0.1 to 0.6 µm, more preferably 0.3 to 0.5 µm, much more preferably 0.3 to 0.4 µm. When the particle diameter of polytetrafluoroethylene is smaller than 0.1 µm, the surface of the obtained molded product has a good appearance. However, it is difficult to acquire a commercially available product of polytetrafluoroethylene having a diameter smaller than 0.1 µm. When the diameter is larger than 0.6 µm, the surface of the obtained molded product has a bad appearance. This diameter is obtained by measuring the diameter of a sample solution prepared by diluting a particle dispersion with water by a dynamic light scattering method (ELS800 of Otsuka Denshi Co., Ltd., temperature of 25° C., scattering angle of 90°).

The number average molecular weight of polytetrafluoroethylene used in the present invention is preferably $1\times10^6$ to $1\times10^7$, more preferably $2\times10^6$ to $9\times10^6$. Polytetrafluoroethylene having a high molecular weight is generally more preferred from the viewpoint of stability. It may be used in the form of a powder or a dispersion. The mixture (component B) of the present invention contains deformed polytetrafluoroethylene which can be used as a flame retardant aid. Preferably, the polytetrafluoroethylene particles have an diameter of 0.1 to 0.6 µm and a number average molecular weight of $1\times10^6$ to $1\times10^7$.

Polytetrafluoroethylene is available on the market in the form of a powder or a dispersion according to its molecular weight. Commercially available products of the polytetrafluoroethylene powder used in the mixture (component B) of the present invention include Teflon (registered trademark) 6J (Mitsui-Dupont Fluoro Chemicals Co., Ltd.) and Polyfuron MPA500 and F-201L (Daikin industries, Ltd.). Commercially available products of the polytetrafluoroethylene dispersion used in the mixture (component B) include Furon AD-1 and AD-936 (Asahi-ICI Fluoropolymers Co:, Ltd.), Polyfuron D-1 and Polyfuron D-2 (Daikin Industries, Ltd.), Teflon (registered trademark) 30J (Mitsui-Dupont Fluoro Chemicals Co., Ltd.), FR302 (3F Co.) and JF4DC (Juseng Fluoro Chemicals Co., Ltd.). These polytetrafluoroethylene powders or dispersions may be used alone or in combination of two or more.

The polytetrafluoroethylene content of the mixture (component B) is preferably 20 to 60 parts by weight, more preferably 40 to 55 parts by weight, much more preferably 47 to 53 parts by weight, further more preferably 48 to 52 parts by weight, most preferably 49 to 51 parts by weight based on 100 parts by weight of the mixture (component B). When the polytetrafluoroethylene content falls within the above range, the excellent dispersibility of polytetrafluoroethylene can be attained.

(Organic Polymer)

The organic polymer is preferably a polymer of a styrene-based monomer and/or an acrylic monomer.

The organic polymer is preferably a styrene-acrylic polymer. The styrene-acrylic polymer is a polymer of a styrene-based monomer (i) and an acrylic monomer (ii), the styrene-based monomer (i) may be substituted by at least one group selected from the group consisting of an alkyl group having 1 to 6 carbon atoms, alkoxy group having 1 to 6 carbon atoms and halogen atom, and the acrylic monomer (ii) preferably contains an (meth)acrylate derivative which may be substituted by at least one group selected from the group consisting of an alkyl group having 1 to 20 carbon atoms, cycloalkyl group having 3 to 8 carbon atoms, aryl group and glycidyl group.

The styrene-based monomer (i) is, for example, styrene which may be substituted by at least one group selected from the group consisting of an alkyl group having 1 to 6 carbon atoms, alkoxy group having 1 to 6 carbon atoms and halogen atom. Examples of the alkyl group having 1 to 6 carbon atoms include methyl group, ethyl group and butyl group. Examples of the alkoxy group having 1 to 6 carbon atoms include methoxy group, ethoxy group and butoxy group. Examples of the halogen atom include fluorine atom and bromine atom. Examples of the styrene-based monomer (i) include ortho-methylstyrene, meta-methylstyrene, para-methylstyrene, dimethylstyrene, ethyl-styrene, para-tert-butylstyrene, methoxystyrene, fluorostyrene, monobromostyrene, dibromostyrene, tribromostyrene, vinylxylene and vinylnaphthalene. The styrene-based monomers (i) may be used alone or in combination of two or more.

The acrylic monomer (ii) contains a (meth)acrylate derivative which may be substituted. The acrylic monomer (ii) is, for example, a (meth)acrylate derivative which may be substituted by at least one group selected from the group consisting of an alkyl group having 1 to 20 carbon atoms, cycloalkyl group having 3 to 8 carbon atoms, aryl group and glycidy group. Examples of the alkyl group having 1 to 20 carbon atoms include methyl group, ethyl group, butyl group, hexyl group, octyl group and dodecyl group. Examples of the cycloalkyl group having 3 to 8 carbon atoms include cyclohexyl group and cyclooctyl group. Examples of the aryl group include phenyl group and naphthyl group. Examples of the acrylic monomer (ii) include (meth)acrylonitrile, methyl (meth)acrylate, ethyl(meth)acrylate, propyl(meth)acrylate, butyl(meth)acrylate, amyl(meth)acrylate, hexyl(meth)acrylate, 2-ethylhexyl(meth)acrylate, cyclohexyl(meth)acrylate, octyl(meth)acrylate, dodecyl(meth)acrylate, phenyl(meth)acrylate, benzyl(meth)acrylate and glycidyl(meth)acrylate. Maleimides which may be substituted by an alkyl group having 1 to 6 carbon atoms or aryl group, such as maleimide, N-methyl-maleimide and N-phenyl-maleimide, maleic acid, phthalic acid and itaconic acid are also included. The acrylic monomers (ii) may be used alone or in combination of two or more. Out of these, (meth)acrylonitrile is preferred.

The amount of the acrylic monomer (ii) is 8 to 11 parts by weight, preferably 8 to 10 parts by weight, more preferably 8 to 9 parts by weight based on 100 parts by weight of the styrene-based monomer (i). When the amount of the acrylic monomer (ii) is smaller than 8 parts by weight, coating strength may lower and when the amount is larger than 11 parts by weight, the surface of the obtained molded product may have a bad appearance.

The mixture (component B) is preferably obtained by polymerizing an organic monomer in the presence of polytetrafluoroethylene particles without forming a latex.

The mixture (component B) has a residual water content of preferably 0.5 wt % or less, more preferably 0.2 to 0.4 wt %, much more preferably 0.1 to 0.3 wt %. When the residual water content is higher than 0.5 wt %, it may exert a bad influence upon flame retardancy.

The process of manufacturing the mixture (component B) includes the step of forming a coating layer containing at least one monomer selected from the group consisting of the styrene-based monomer (i) and the acrylic monomer (ii) on the exterior of polytetrafluoroethylene in the presence of an initiator. Further, after the coating layer is formed, the process preferably further comprises the step of drying the coating layer to reduce its residual water content to 0.5 wt % or less, preferably 0.2 to 0.4 wt %, much more preferably 0.1 to 0.3 wt %. The drying step can be carried out by a method known in this industry such as hot air drying or vacuum drying.

The initiator used in the mixture (component B) is not particularly limited if it can be used for the polymerization reaction of the styrene-based monomer (i) and/or the acrylic monomer (ii). Examples of the initiator include cumyl hydroperoxide, di-tert-butyl peroxide, benzoyl peroxide, hydrogen peroxide and potassium peroxide. At least one initiator may be used for the mixture (component B) according to reaction conditions. The amount of the initiator is freely selected from among the range which is used in consideration of the amount of polytetrafluoroethylene and the types and amounts of the monomers but preferably 0.15 to 0.25 wt % based on the amount of the whole composition.

(Sodium Metal Ion and Potassium Metal Ion)

The contents of the sodium metal ion (excluding sodium metal ion contained in polytetrafluoroethylene) of the mixture (component B) is 10 ppm or less, preferably 8 ppm or less, more preferably 5 ppm or less. The contents of the potassium metal ion (excluding potassium metal ion contained in polytetrafluoroethylene) of the mixture (component B) is preferably 15 ppm or less, more preferably 10 ppm or less, much more preferably 5 ppm or less. When the contents of these elemental metals are larger than the above specified values, a catalytic effect for promoting the decomposition of the aromatic polycarbonate resin by heat and/or water generated at the time of extrusion or molding is developed, whereby the thermal stability and hydrolysis resistance of the resin composition comprising the mixture (component B) deteriorate.

The sodium metal ion and potassium metal ion contents of the mixture (component B) can be measured by the following method.

First, about 0.1 g of the mixture (component B) is weighed and fed to a quartz vessel, 5 ml of nitric acid is added, the vessel is sealed up, and the decomposition of the mixture is carried out by applying microwaves (MULTIWAVE of Anton Paar Co., Ltd.). Polytetrafluoroethylene is not decomposed at this point. After decomposition, polytetrafluoroethylene is taken out and rinsed with super pure water, the decomposition solution is added to the rinsing liquid, and super pure water is added to the mixture to prepare 50 ml of a solution. This solution is diluted to prepare a sample solution. The quantitative analysis of sodium metal ion and potassium metal ion contained in the sample solution is carried out by inductively-coupled plasma source mass spectrometry (ICP-MS) (Agilent7500cs of Yokokawa Anality Systems Co., Ltd.) to obtain their concentrations based on the weight of the sample.

(Manufacture of Mixture (Component B))

The mixture (component B) having reduced contents of sodium metal ion and potassium metal ion can be manufactured by suspension polymerization.

The suspension polymerization can be carried out by the following procedure. First, water and a polytetrafluoroethylene dispersion (solid content: 60%, polytetrafluoroethylene particle diameter: 0.15 to 0.3 μm) are fed to a reactor, and an acrylic monomer, a styrene monomer and cumene hydroperoxide as a water-soluble initiator are added under agitation to carry out a reaction at 80 to 90° C. for 9 hours. After the end of the reaction, centrifugation is carried out by a centrifugal separator for 30 minutes to remove water so as to obtain a paste product. Thereafter, the paste product is dried with a hot air drier at 80 to 100° C. for 8 hours. The dried product is ground to obtain the mixture.

Since suspension polymerization does not require a polymerization step which is carried out by emulsion dispersion in emulsion polymerization illustrated in Japanese Patent No. 3,469,391, an electrolyte salt for solidifying and precipitating an emulsifier and a latex after polymerization is not necessary. Since the emulsifier and the electrolyte salt are readily contained in a mixture manufactured by emulsion polymerization and hardly removed, it is difficult to reduce sodium metal ion and potassium metal ion derived from the emulsifier and the electrolyte salt. As the mixture (component B) used in the present invention is manufactured by suspension polymerization, the emulsifier and the electrolyte salt are not used. Therefore, the sodium metal ion and potassium metal ion contents of the mixture (component B) are low, thereby making it possible to improve the thermal stability and hydrolysis resistance of the resin composition.

(Component C: Flame Retardant)

The resin composition of the present invention contains a flame retardant (component C). The component C is a compound known as a flame retardant for aromatic polycarbonate resins. The flame retardancy of the resin composition is improved by containing the component C, moreover, antistatic properties, fluidity, stiffness and thermal stability are improved based on the properties of the compound. Examples of the flame retardant include (i) organic metal salt-based flame retardants (such as alkali (earth) metal salts of an organic sulfonic acid, boric acid metal salt-based flame retardants and stannic acid metal salt-based flame retardants), (ii) organic phosphorus-based flame retardants (such as monophosphate compounds, phosphate oligomer compounds, phosphonate oligomer compounds, phosphonitrile oligomer compounds and phosphonic acid amide compounds), and (iii) silicone-based flame retardants comprising a silicone compound. Out of these, organic metal salt-based flame retardants are preferred.

(i) Organic Metal Salt-Based Flame Retardants

The organic metal salt compound in the present invention is preferably an alkali (earth) metal salt of an organic sulfonic acid having 1 to 50 carbon atoms, preferably 1 to 40 carbon atoms. This alkali (earth) metal salt of an organic sulfonic acid includes metal salts of a fluorine-substituted alkylsulfonic acid such as metal salts of a perfluoroalkylsulfonic acid having 1 to 10 carbon atoms, preferably 2 to 8 carbon atoms and an alkali metal or alkali earth metal. It also includes metal salts of an aromatic sulfonic acid having 7 to 50 carbon atoms, preferably 7 to 40 carbon atoms and an alkali metal or alkali earth metal.

Examples of the alkali metal constituting the metal salts include lithium, sodium, potassium, rubidium and cesium. Examples of the alkali earth metal include beryllium, magnesium, calcium, strontium and barium. Alkali metals are more preferred. Out of the alkali metals, rubidium and cesium having a large ion radius are preferred when the requirement for transparency is higher. However, as they are not used for general purpose and difficult to be purified, they may be disadvantageous in terms of cost. Meanwhile, metals having a small ion radius such as lithium and sodium may be disadvantageous in terms of flame retardancy. Although an alkali metal in the sulfonic acid alkali metal salt can be selected in consideration of these, a sulfonic acid potassium salt having good balance among properties is most preferred. The potassium salt may be used in combination with a sulfonic acid alkali metal salt which comprises another alkali metal.

A fluorine-containing organic metal salt-based flame retardant such as a perfluoroalkylsulfonic acid alkali metal salt is preferred as the organic metal salt-based flame retardant.

Examples of the perfluoroalkylsulfonic acid alkali metal salt include potassium trifluoromethanesulfonate, potassium perfluorobutanesulfonate, potassium perfluorohexanesulfonate, potassium perfluorooctanesulfonate, sodium pentafluroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. The number of carbon atoms of the perfluoroalkyl group is preferably 1 to 18, more preferably 1 to 10, much more preferably 1 to 8. Out of these, potassium perfluorobutanesulfonate is particularly preferred.

In general, the alkali (earth) metal salt of a perfluoroalkylsulfonic acid comprising an alkali metal contains a fluoride ion ($F^-$) to no small extent. Since the existence of the fluoride ion may cause a reduction in flame retardancy, it is preferred to reduce the content of the fluoride ion as much as possible. The content of the fluoride ion can be measured by ion chromatography. The content of the fluoride ion is preferably 100 ppm or less, more preferably 40 ppm or less, particularly preferably 10 ppm or less. It is preferred from the viewpoint of manufacturing efficiency that it should be 0.2 ppm or more.

The alkali (earth) metal salt of a perfluoroalkylsulfonic acid having a reduced fluoride ion content can be manufactured by known methods. For example, it can be manufactured by a method in which the content of the fluoride ion in raw materials for manufacturing a fluorine-containing organic metal salt is reduced, a method in which hydrogen fluoride obtained by a reaction is removed by a gas or heat generated at the time of the reaction, or a method in which the content of the fluoride ion is reduced by purification such as recrystallization or re-precipitation in the manufacture of a fluorine-containing organic metal salt. Since the component C is relatively soluble in water, the component C is preferably manufactured by dissolving it in ion exchange water, particularly water having an electric resistance of 18 MΩ·cm or more, that is, electric conductivity of about 0.55 μS/cm or less at a temperature higher than normal temperature to clean it and cooling it for recrystallization.

Examples of the alkali (earth) metal salt of an aromatic sulfonic acid include disodium diphenyl sulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenyleneoxide)polysulfonate, polysodium poly(1,3-phenyleneoxide)polysulfonate, polysodium poly(1,4- phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsufone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenyl sulfoxide-4-sulfonate, formalin condensate of sodium naphthalenesulfonate, and formalin condensate of sodium athracenesulfonate. Out of these alkali (earth) metal salts of an aromatic sulfonic acid, potassium salts are preferred. Out of these alkali (earth) metal salts of an aromatic sulfonic acid, potassium diphenylsufone-3-sulfonate and dipotassium diphenylsulfone-3,3'-disulfonate are more preferred and a mixture thereof (the weight ratio of the former to the latter is 15/85 to 30/70) is particularly preferred.

Preferred organic metal salts other than the alkali (earth) metal salts of a sulfonic acid are alkali (earth) metal salts of a sulfuric acid ester and alkali (earth) metal salts of an aromatic sulfonamide. The alkali (earth) metal salts of a sulfuric acid ester include alkali (earth) metal salts of a monohydric and/or polyhydric alcohol sulfuric acid ester such as methyl sulfuric acid ester, ethyl sulfuric acid ester, lauryl sulfuric acid ester, hexadecyl sulfuric acid ester, sulfuric acid esters of a polyoxyethylene alkylphenyl ether, mono-, di-, tri- and tetra-sulfuric acid esters of pentaerythritol, sulfuric acid esters of monoglyceride laurate, sulfuric acid esters of monoglyceride palmitate, and sulfuric acid esters of monoglyceride stearate. The alkali (earth) metal salts of these sulfuric acid esters include alkali (earth) metal salts of lauryl sulfuric acid esters.

The alkali (earth) metal salts of an aromatic sulfonamide include alkali (earth) metal salts of saccharin, N-(p-tolylsulfonyl)-p-toluene sulfoimide, N-(N'-benzylaminocarbonyl)sulfanilimide and N-(phenylcarboxyl)sulfanilimide.

The content of the organic metal salt-based flame retardant (component C) is 0.01 to 20 parts by weight, preferably 0.03 to 10 parts by weight, more preferably 0.05 to 5 parts by weight based on 100 parts by weight of the total of the components A, B and C.

(ii) Organic Phosphorus-Based Flame Retardant

An aryl phosphate compound is preferred as the organic phosphorus-based flame retardant. This is because the phosphate compound has a good color. Further, the phosphate compound is advantageous in enhancing the moldability of the resin composition of the present invention as it has a plasticizing effect. Although phosphate compounds which have been known as flame retardants may be used as the phosphate compound, one or more phosphate compounds represented by the following general formula (i) are preferred.

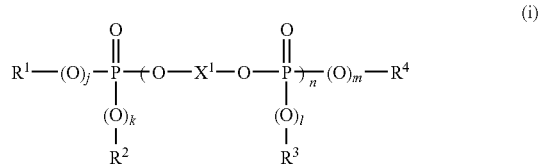

(i)

In the above formula, $X^1$ is a divalent organic group derived from a diphenol, and $R^1$, $R^2$, $R^3$ and $R^4$ are each 25 independently a monovalent organic group derived from a monophenol. J, k, l and m are each independently 0 or 1, and n is an integer of 0 to 5. In the case of a mixture of phosphates which differ in the degree n of polymerization, n is an average value of these, that is, 0 to 5.

The above phosphate compound may be a mixture of compounds which differ in "n". In the case of a mixture, the average value of "n" is preferably 0.5 to 1.5, more preferably 0.8 to 1.2, much more preferably 0.95 to 1.15, particularly preferably 1 to 1.14.

Preferred examples of the diphenol from which $X^1$ is derived include divalent groups obtained by removing two hydroxyl groups of a dihydroxy compound selected from the group consisting of hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide. Examples of $R^1$, $R^2$, $R^3$ and $R^4$ include monovalent groups obtained by removing one hydroxyl group of a monohydroxy compound selected from the group consisting of phenol, cresol, xylenol, isopropylphenol, butylphenol and p-cumylphenol which may be independently substituted by one or more halogen atoms.

Preferred examples of the monophenol from which $R^1$, $R^2$, $R^3$ and $R^4$ are derived include phenol, cresol, xylenol, isopropylphenol, butylphenol and p-cumylphenol. Out of these, phenol and 2,6-dimethylphenol are preferred.

The monophenol may be substituted by a halogen atom. Examples of the phosphate compound having a group derived from the monophenol include tris(2,4,6-tribromophenyl)phosphate, tris(2,4-dibromophenyl)phosphate and tris(4-bromophenyl)phosphate.

Examples of the phosphate compound which is not substituted by a halogen atom include monophosphate compounds such as triphenyl phosphate and tri(2,6-xylyl)phosphate, a phosphate oligomer essentially composed of resorcinol bisdi(2,6-xylyl)phosphate), phosphate oligomer essentially composed of 4,4-dihydroxydiphenyl bis(diphenylphosphate), phosphoric ester oligomer essentially composed of bisphenol A bis(diphenylphosphate) ("essentially" means that another component which differs in the degree of polymerization may be contained in a small amount, a component in which n=1 in the above formula (1) is contained in an amount of preferably 80 wt % or more, more preferably 85 wt % or more, much more preferably 90 wt % or more).

The content of the organic phosphorus-based flame retardant (Component C) is 0.01 to 20 parts by weight, preferably 2 to 10 parts by weight, more preferably 2 to 7 parts by weight based on 100 parts by weight of the total of the components A, B and C.

(iii) Silicone-Based Flame Retardant

A silicone compound used as the silicone-based flame retardant improves flame retardancy by its chemical reaction at the time of combustion. Various compounds proposed as flame retardants for aromatic polycarbonate resins may be used as the compound. It is considered that the silicone compound provides a flame retarding effect to an aromatic polycarbonate resin by a structure which is formed by bonding by itself or to a component derived from a resin at the time of combustion or a reduction reaction at the time of forming the structure. Therefore, it is preferred that the silicone compound should contain a highly active group, specifically a predetermined amount of at least one group selected from an alkoxy group and hydrogen (that is, Si—H group) at the time of the reaction. The content of the group (alkoxy group, Si—H group) is preferably 0.1 to 1.2 mol/100 g, more preferably 0.12 to 1 mol/100 g, much more preferably 0.15 to 0.6 mol/100 g. This content can be obtained by measuring the amount of hydrogen or alcohol generated per unit weight of the silicone compound by an alkali decomposition method.

The alkoxy group is preferably an alkoxy group having 1 to 4 carbon atoms, particularly preferably methoxy group.

The structure of the silicone compound is generally constituted by combining the following four siloxane units arbitrarily. That is, they are:

M unit: monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ and $(CH_3)(C_6H_5)(CH_2=CH)SiO_{1/2}$ D unit: bifunctional siloxane units such as $(CH_3)_2SiO$, $H(CH_3)SiO$, $H_2SiO$, $H(C_6H_5)SiO$, $(CH_3)(CH_2=CH)SiO$ and $(C_6H_5)_2SiO$ T unit: trifunctional siloxane units such as $(CH_3)_3SiO_{3/2}$, $(C_3H_7)SiO_{3/2}$, $HSiO_{3/2}$ $(CH_2=CH)SiO_{3/2}$ and $(C_6H_5)SiO_{3/2}$ Q unit: tetrafunctional siloxane unit represented by $SiO_2$.

The structure of the silicone compound used as a silicone-based flame retardant is represented by $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

The coefficients m, n, p and q in the above formulas are each an integer of 1 or more, each indicating the number of siloxane units, and the total number of coefficients in the formulae is the average degree of polymerization of the silicone compound. The average degree of polymerization is preferably 3 to 150, more preferably 3 to 80, much more preferably 3 to 60, particularly preferably 4 to 40. Within the more preferred range, the silicone compound has more excellent flame retardancy. As will be described hereinafter, a silicone compound containing a predetermined amount of an aromatic group is excellent in transparency and color. As a result, good reflected light is obtained.

When either one of m, n, p and q is 2 or more, 2 or more of the siloxane units having this coefficient may differ in the hydrogen atom or organic residue bonded thereto.

The silicone compound may have a linear or branched structure. The organic residue bonded to the silicon atom has preferably 1 to 30 carbon atoms, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group and aralkyl groups such as tolyl group. It is more preferably an alkyl group having 1 to 8 carbon atoms, alkenyl group or aryl group. The alkyl group is preferably an alkyl group having 1 to 4 carbon atoms such as methyl group, ethyl group or propyl group.

Further, the silicone compound used as the flame retardant preferably contains an aryl group. A silane compound and a siloxane compound as organic surface finishing agents for a titanium dioxide pigment are clearly distinguished from a silicone-based flame retardant as a preferred effect is obtained when they do not contain an aryl group. The silicone-based flame retardant is more preferably a silicone compound which contains 10 to 70 wt % (preferably 15 to 60 wt %) of an aromatic group represented by the following general formula (ii).

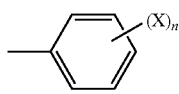
(ii)

In the formula (ii), X's are each independently an OH group or monovalent organic residue having 1 to 20 carbon atoms. n is an integer of 0 to 5. Further, in the formula (ii), when n is 2 or more, X's may be different from each other.

A silicone compound used as a silicone-based flame retardant may contain a reactive group in addition to the above Si—H group and alkoxy group. Examples of the reactive group include amino group, carboxyl group, epoxy group, vinyl group, mercapto group and methacryloxy group.

A silicone compound having an Si—H group is preferably a silicone compound having at least one structural unit represented by the following general formula (iii) or (iv).

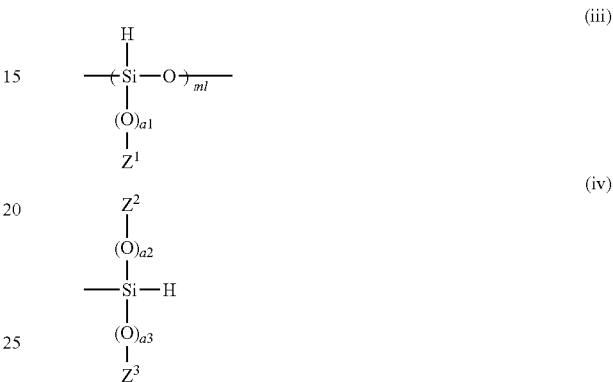

In the formulas (iii) and (iv), $Z^1$ to $Z^3$ are each independently a hydrogen atom, monovalent organic residue having 1 to 20 carbon atoms or compound represented by the following general formula (v). $\alpha 1$ to $\alpha 3$ are each independently 0 or 1. m1 is an integer of 0, 1 or more. Further, when m1 is 2 or more in the formula (iii), the recurring units may be different from each other.

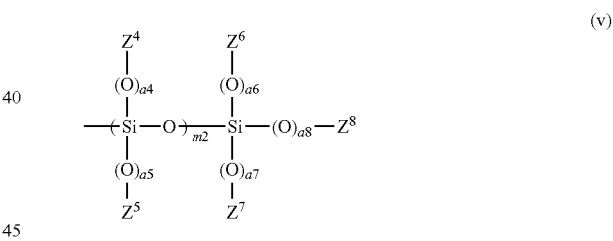

In the formula (v), $Z^4$ to $Z^8$ are each independently a hydrogen atom or monovalent organic residue having 1 to 20 carbon atoms. $\alpha 4$ to $\alpha 8$ are each independently 0 or 1. m2 is an integer of 0, 1 or more. Further, when m2 is 2 or more in the formula (v), the recurring units may be different from each other.

A silicone compound having an alkoxy group used as the silicone-based flame retardant is at least one compound selected from the group consisting of compounds represented by the general formulas (vi) to (vii).

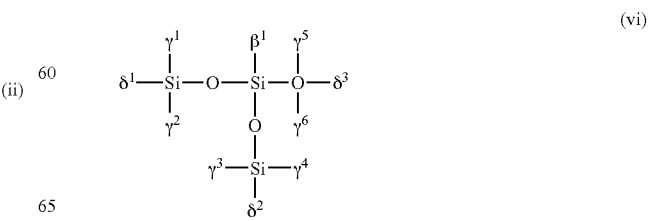

In the formula (vi), $\beta^1$ is a vinyl group, alkyl group having 1 to 6 carbon atoms, cycloalkyl group having 3 to 6 carbon atoms, or aryl group or aralkyl group having 6 to 12 carbon atoms. $\gamma^1$, $\gamma^2$, $\gamma^3$, $\gamma^4$, $\gamma^5$ and $\gamma^6$ are each an alkyl group having 1 to 6 carbon atoms, cycloalkyl group, or aryl group or aralkyl group having 6 to 12 carbon atoms, and at least one of them is an aryl group or aralkyl group. $\delta^1$, $\delta^2$ and $\delta^3$ are each an alkoxy group having 1 to 4 carbon atoms.

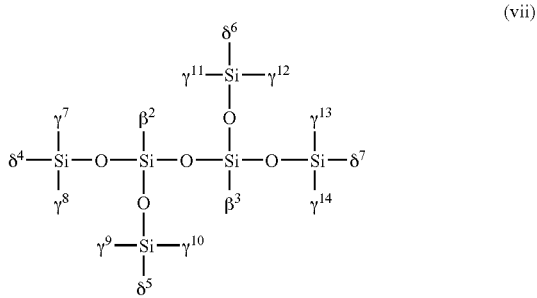

(vii)

In the formula (vii), $\beta^2$ and $\beta^3$ are each a vinyl group, alkyl group having 1 to 6 carbon atoms, cycloalkyl group having 3 to 6 carbon atoms, or aryl group or aralkyl group having 6 to 12 carbon atoms. $\gamma^7$, $\gamma^8$, $\gamma^9$, $\gamma^{10}$, $\gamma^{11}$, $\gamma^{12}$, $\gamma^{13}$ and $\gamma^{14}$ are each an alkyl group having 1 to 6 carbon atoms, cycloalkyl group having 3 to 6 carbon atoms, or aryl group or aralkyl group having 6 to 12 carbon atoms, and at least one of them is an aryl group or aralkyl group. $\delta^4$, $\delta^5$, $\delta^6$ and $\delta^7$ are each an alkoxy group having 1 to 4 carbon atoms.

The content of the silicone-based flame retardant (component C) is 0.01 to 20 parts by weight, preferably 0.5 to 10 parts by weight, more preferably 1 to 5 parts by weight based on 100 parts by weight of the total of the components A, B and C.

(Component D: Reinforcing Filler)

The resin composition of the present invention preferably contains at least one reinforcing filler (component D) selected from the group consisting of a lamellar inorganic filler (component D-1) and a fibrous inorganic filler (component D-2). However, since a good appearance is required for the resin composition of the present invention, a small-sized silicate mineral-based filler or glass-based filler is preferred as the reinforcing filler. Preferred examples of the silicate mineral-based filler include talc, muscovite mica, synthetic fluorine mica, smectite and wollastonite. Preferred examples of the glass-based filler include glass fibers, glass flakes and glass milled fibers.

Therefore, talc is preferred as the component D-1. At least one type of fibrous inorganic filler selected from the group consisting of glass fibers and glass short fibers is preferred as the component D-2.

A silicate mineral-based filler and glass-based filler coated with a metal oxide such as titanium oxide, zinc oxide, cerium oxide or silicon oxide may also be used.

The reinforcing filler may be surface treated with a surface treating agent. Examples of the surface treating agent include silane coupling agents (including alkylalkoxysilanes and polyorganohydrogen siloxanes), higher fatty acid esters, acid compounds (such as phosphorous acid, phosphoric acid, carboxylic acid and carboxylic anhydride) and waxes. The surface treating agent may be granulated by binder such as resin, higher fatty acid ester or wax.

The content of the reinforcing filler (component D) is preferably 1 to 50 parts by weight, more preferably 1 to 30 parts by weight, much more preferably 5 to 20 parts by weight based on 100 parts by weight of the total of the components A, B and C.

(Other Additives)

The resin composition of the present invention may contain various additives which are generally mixed with an aromatic polycarbonate resin, besides the above components A to C.

(i) Phosphorus-Based Stabilizer

The resin composition of the present invention preferably contains a phosphorus-based stabilizer to such an extent that hydrolyzability is not promoted. The phosphorus-based stabilizer improves thermal stability at the time of molding or manufacture, mechanical properties, color and molding stability. The phosphorus-based stabilizer is, for example, a phosphite, phosphate, phosphonite, phosphonate, ester thereof or tertiary phosphine.

Specific examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a diphenol and have acyclic structure may also be used. The phosphite compounds include 2,2-methylenebis(4,6-di-tert-butylphenyl)(2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite and 2,2'-ethylidenebis(4-methyl-6-tert-butylphenyl) (2-tert-butyl-4-methylphenyl)phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Out of these, tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with a phosphite compound having aryl groups substituted for two or more of the above alkyl groups.

Examples of the phosphonate compound include dimethylbenzene phosphonate, diethylbenzene phosphonate and dipropylbenzene phosphonate.

Examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine and diphenylbenzylphosphine. Out of these, triphenylphosphine is particularly preferred.

The above phosphorus-based stabilizers may be used alone or in combination of two or more. Out of the above phosphorus-based stabilizers, an alkyl phosphate compound typified by trimethyl phosphate is preferred. A combination of an alkyl phosphate compound and a phosphite compound and/or a phosphonite compound is also preferred.

(ii) Hindered Phenol-Based Stabilizer

The resin composition of the present invention may further contain a hindered phenol-based stabilizer. The stabilizer can suppress the worsening of a color during molding and after long-term use. Examples of the hindered phenol-based stabilizer include α-tocopherol, butylhydroxytoluene, cinnapyl alcohol, vitamin E, n-octadecyl-β-(4'-hdyroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2'-thiodiethylenebis-[3-(3,5-di-tert-butyl-4-hydroxyphenyl)propionate], 2,4-bis(n-octylthio)-6-(4-hdyroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2[3(3,5-di-tert-butyl-4-hydroxyphenyl)propionyloxy]ethyl isocyanurate and tetrakis[methylene-3-(3',5'-di-tert-butyl-4-hydroxyphenyl)propionate]methane. All of them are easily acquired. The above hindered phenol-based stabilizers may be used alone or in combination of two or more.

The amounts of the above phosphorus-based stabilizer and the hindered phenol-based stabilizer are each preferably 0.0001 to 1 part by weight, more preferably 0.001 to 0.5 part by weight, much more preferably 0.005 to 0.3 part by weight based on 100 parts by weight of the aromatic polycarbonate resin (component A).

(iii) Other Heat Stabilizers

The resin composition of the present invention may contain a heat stabilizer other than the above phosphorus-based stabilizer and the hindered phenol-based stabilizer. Examples of other heat stabilizer include lactone-based stabilizers typified by a reaction product between 3-hydroxy-5,7-di-tert-butyl-furan-2-one and o-xylene. Details of the stabilizer are described in JP-A 7-233160. The compound is marketed under the trade name of Irganox HP-136 (registered trade name, manufactured by Ciba Specialty Chemicals, K.K.). Further, a stabilizer comprising the compound, a phosphite compound and a hindered phenol compound is available on the market. For example, Irganox HP-2921 is such an example. The amount of the lactone-based stabilizer is preferably 0.0005 to 0.05 part by weight, more preferably 0.001 to 0.03 part by weight based on 100 parts by weight of the component A.

Other stabilizers include sulfur-containing stabilizers such as pentaerythritol tetrakis(3-mercaptopropionate), pentaerythritol tetrakis(3-laurylthiopropionate) and glycerol-3-stearylthiopropionate. The amount of the above sulfur-containing stabilizer is preferably 0.001 to 0.1 part by weight, more preferably 0.01 to 0.08 part by weight based on 100 parts by weight of the component A.

(iv) Ultraviolet Light Absorber

The resin composition of the present invention may contain an ultraviolet light absorber to provide light resistance. The ultraviolet light absorber is, for example, a benzophenone-based, benzotriazole-based, hydroxyphenyltriazine-based, cyclic iminoester-based or cyanoacrylate-based ultraviolet light absorber.

Examples of the benzophenone-based ultraviolet light absorber include 2,4-dihdyroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydriderate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the benzotriazole-based ultraviolet light absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-phenylenebis(1,3-benzoxazin-4-one), 2-[2-hydroxy-3-(3,4,5,6-tetrahydrophthalimidemethyl)-5-methylphenyl]benzotriazole, and a polymer having a 2-hydroxyphenyl-2H-benzotraizole skeleton such as copolymer of 2-(2'-hydroxy-5-methacryloxyethylphenyl)-2H-benzotriazole and a vinyl-based monomer copolymerizable with the monomer and a copolymer of 2-(2'-hydroxy-5-acryloxyethylphenyl)-2H-benzotriazole and a vinyl-based monomer copolymerizable with the monomer.

Examples of the hydroxyphenyltriazine-based ultraviolet light absorber include 2-(4,6-diphenyl-1,3-5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Compounds having a 2,4-dimethylphenyl group in place of the above phenyl groups of the above compounds such as 2-(4,6-bis(2,4-dimethylphenyl)-1,3,5-triazin-2-yl)-5-hexyloxyphenol) may also be used.

Examples of the cyclic iminoester-based ultraviolet light absorber include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Examples of the cyanoacrylate-based ultraviolet light absorber include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

Further, the ultraviolet light absorber may be a polymer type ultraviolet light absorber obtained by copolymerizing an ultraviolet light absorbing monomer having a radically polymerizable monomer compound structure and/or an optical stabilizing monomer and a monomer such as an alkyl(meth)acrylate. The above ultraviolet light absorbing monomer is preferably a compound having a benzotriazole skeleton, benzophenone skeleton, triazine skeleton, cyclic iminoester skeleton or cyanoacrylate skeleton in the ester substituent of a (meth)acrylate.

Benzotriazole-based and hydroxyphenyltriazine-based ultraviolet light absorbers are preferred from the viewpoint of ultraviolet light absorbing ability, and cyclic iminoester-based and cyanoacrylate-based ultraviolet light absorbers are preferred from the viewpoints of heat resistance and color. The above ultraviolet light absorbers may be used alone or in combination of two or more.

The amount of the ultraviolet light absorber is preferably 0.01 to 2 parts by weight, more preferably 0.03 to 2 parts by weight, much more preferably 0.02 to 1 part by weight, particularly preferably 0.05 to 0.5 part by weight based on 100 parts by weight of the aromatic polycarbonate resin (component A).

(v) Other Resin and Elastomer

The resin composition of the present invention may contain a small amount of another thermoplastic resin (component E) in place of part of the aromatic polycarbonate resin (component A) in limits that the effect of the present invention is obtained. The amount of the thermoplastic resin (component E) is preferably 1 to 50 parts by weight, more preferably 1 to 20 parts by weight, much more preferably 1 to 10 parts by weight, particularly preferably 1 to 5 parts by weight based on 100 parts by weight of the total of the components A and E.

Examples of the thermoplastic resin (component E) include polyester resins such as polyethylene terephthalate and polybutylene terephthalate, polyamide resins, polyimide resins, polyether imide resins, polyurethane resins, silicone resins, polyphenylene ether resins, polyphenylene sulfide resins, polysulfone resins, polyolefin resins such as polyethylene and polypropylene, polystyrene resins, acrylonitrile/styrene copolymer (AS resin), acrylonitrile/butadiene/styrene copolymer (ABS resin), polymethacrylate resins, phenolic resins and epoxy resins.

Examples of the thermoplastic resin (component E) include isobutylene/isoprene rubber, styrene/butadiene rubber, ethylene/propylene rubber, acrylic elastomers, polyester-based elastomers, polyamide-based elastomers, core-shell type elastomers such as MBS (methyl methacrylate/styrene/butadiene) rubber and MAS (methyl methacrylate/acrylonitrile/styrene) rubber. The component E is preferably a polyester resin and/or ABS resin.

(vi) Other Components

The resin composition of the present invention may contain small amounts of additives known per se to provide various functions to a molded product and improve its characteristic properties. These additives are used in normal amounts as long as the object of the present invention is not impaired.

The additives include a lubricant (such as PTFE particles), colorant (pigment or dye such as carbon black or titanium oxide), light diffusing agent (such as acrylic crosslinked particles, silicone crosslinked particles or calcium carbonate particles), fluorescent dye, fluorescent brightener, optical stabilizer (typified by hindered amine compounds, inorganic phosphor (such as a phosphor comprising an aluminate as a mother crystal), antistatic agent, crystal nucleating agent, inorganic and organic antifungus agent, optical catalyst-based anti-fouling agent, (such as fine particle titanium oxide and fine particle zinc oxide), releasing agent, fluid modifier, radical generator, infrared light absorber (heat ray absorber) and photochromic agent.

<Process for Manufacturing Resin Composition>

The resin composition of the present invention can be manufactured by melt kneading the above components with a multi-screw extruder such as a double-screw extruder.

Typical examples of the double-screw extruder include ZSK (of Werner & Pfleiderer Co., Ltd., trade name). Other examples of the extruder of the same type include TEX (of The Japan Steel Works, Ltd., trade name), TEM (of Toshiba Machine Co., Ltd., trade name), and KTX (of Kobe Steel Ltd., trade name). Melt kneaders such as FCM (of Farrel Co., Ltd., trade name), Ko-Kneader (of Buss Co., Ltd., trade name) and DSM (of Krauss-Maffei Co., Ltd., trade name) may also be used. Out of these, a ZSK type double-screw extruder is more preferred. In the ZSK type double-screw extruder, the screws are of a completely interlocking type and consist of screw segments which differ in length and pitch and kneading disks which differ in width (or kneading segments corresponding to these).

A preferred example of the double-screw extruder is as follows. As for the number of screws, one, two or three screws may be used, and two screws can be preferably used because they have wide ranges of molten resin conveyance capacity and shear kneading capacity. The ratio (L/D) of the length (L) to the diameter (D) of the screw of a double-screw extruder is preferably 20 to 45, more preferably 28 to 42. When L/D is large, homogeneous dispersion is easily attained and when L/D is too large, the decomposition of the resin readily occurs by heat deterioration. The screw must have at least one, preferably one to three kneading zones, each composed of a kneading disk segment (or a kneading segment corresponding to this) in order to improve kneadability.

Further, an extruder having a vent for removing moisture contained in raw materials and a volatilized gas generated from the molten and kneaded resin can be preferably used. A vacuum pump is preferably installed to discharge the moisture or volatilized gas to the outside of the extruder from the vent efficiently. A screen for removing foreign matter contained in the raw materials to be extruded may be installed in a zone before the dice of the extruder to eliminate foreign matter from the resin composition. Examples of the screen include a metal net, screen changer and sintered metal plate (disk filter, etc.).

Further, the method of supplying the component B and other additives (to be simply referred to as "additives" in the following examples) into the extruder is not particularly limited. The following methods are typical examples of the method: (i) one in which the additives are supplied into an extruder separately from the aromatic polycarbonate resin (component A), (ii) one in which the additives and the aromatic polycarbonate resin powder are pre-mixed by a mixer such as a super mixer and supplied into an extruder, and (iii) one in which the additives and the aromatic polycarbonate resin are molten and kneaded together in advance to prepare a master pellet.

One means of the method (ii) is to pre-mix all the necessary raw materials together and supply the resulting mixture into the extruder. The other means of the method is to prepare a master agent which contains the additives in high concentrations and supply the master agent into the extruder independently or after it is pre-mixed with the remaining aromatic polycarbonate resin. The master agent may be in the form of a powder or granule prepared by compacting and granulating the powder. Other pre-mixing means is a Nauter mixer, twin-cylinder mixer, Henschel mixer, mechanochemical device or extrusion mixer. Out of these, a high-speed agitation type mixer such as a super mixer is preferred. Another pre-mixing method is to uniformly disperse the aromatic polycarbonate resin and the additives in a solvent to prepare a solution and remove the solvent from the solution.

The resin extruded from the extruder is pelletized by directly cutting it or by forming it into a strand and cutting the strand by a pelletizer. When the influence of external dust must be reduced, the atmosphere surrounding the extruder is preferably cleaned. In the manufacture of the above pellet, it is possible to narrow the form distribution of pellets, reduce the number of miscut products, reduce the amount of fine powders generated at the time of conveyance or transportation and reduce the number of cells (vacuum cells) formed in the strand or pellet by using various methods already proposed for aromatic polycarbonate resins for optical disks. Thereby, it is possible to increase the molding cycle and reduce the incidence of a defect such as a silver streak. The shape of the pellet may be columnar, rectangular column-like or spherical, preferably columnar. The diameter of the column is preferably 1 to 5 mm, more preferably 1.5 to 4 mm, much more preferably 2 to 3.3 mm. The length of the column is preferably 1 to 30 mm, more preferably 2 to 5 mm, much more preferably 2.5 to 3.5 mm.

<Molded Product>

The resin composition of the present invention is generally used in the form of a pellet as a raw material to be injection molded. The resin composition which has been melt kneaded by an extruder may be directly molded into a sheet, film, odd-shaped extrusion molded product, direct blow molded product or injection molded product without being pelletized.

Molded products can be obtained not only by ordinary molding techniques but also by injection molding techniques such as injection compression molding, injection press molding, gas assist injection molding, foam molding (including what comprises the injection of a super-critical fluid), insert molding, in-mold coating molding, insulated runner molding, quick heating and cooling molding, two-color molding, sandwich molding and super high-speed injection molding according to purpose. The advantages of these molding techniques are already widely known. Both cold-runner molding and hot-runner molding techniques may be employed.

The resin composition of the present invention may be formed into a molded product, sheet or film by extrusion molding. Inflation, calendering and casting techniques may be used to mold a sheet or film. Further, a specific drawing operation may be used to mold it into a heat shrinkable tube. The resin composition of the present invention can be formed into a molded product by rotational molding or blow molding.

Further, a molded product of the resin composition of the present invention can be subjected to a surface treatment. The surface treatment is deposition (physical deposition, chemical deposition, etc.), plating (electroplating, electroless plating, hot dipping, etc.), painting, coating or printing, all of which are used to form a new layer on the surface layer of a resin molded product and are applicable for methods generally used for an aromatic polycarbonate resin. Specific examples of the surface treatment include hard coating, water repellent and oil repellent coating, ultraviolet light absorption coating, infrared light absorption coating and metallizing (such as deposition).

EXAMPLES

The following examples are provided to further illustrate the present invention. Evaluations were made by the following methods.

(1) Flame Retardancy

An UL94 vertical burn test was made on a sample having a thickness of 1.6 mm. or 2.4 mm to evaluate its flame retardancy.

(2) Evaluation of Appearance

The obtained pellet was dried with a hot air drier at 120° C. for 6 hours and molded into a plate having a thickness of 2 mm (length of 40 mm, width of 50 mm) with an injection molding machine (SG-150U of Sumitomo Heavy Industries, Ltd.) at a cylinder temperature of 290° C. (240° C. in Examples 54 and 55 and Comparative Example 28) and a mold temperature of 80° C. (60° C. in Examples 54 and 55 and Comparative Example 28). 10 shots of the resin right after purge were thrown away and an 11-th shot was used for the evaluation of color and surface state (existence of a streak on the surface). The sample was evaluated based on the following criteria.

◯: formation of no streak
Δ: formation of a slight streak
×: formation of a streak (3) Impact Strength (i) Measurement of Sharpy Impact Strength:

An impact test sample was formed by injection molding to measure its notched Sharpy impact strength in accordance with ISO 179.

(ii) Measurement of High-Speed Puncture Strength:

The obtained pellet was dried with a hot air drier at 120° C. for 6 hours and molded into a plate having a thickness of 2 mm (length of 150 mm, width of 150 mm) with an injection molding machine (SG-150U of Sumitomo Heavy Industries, Ltd.) at a cylinder temperature of 290° C. (240° C. in Examples 54 and 55 and Comparative Example 28) and a mold temperature of 80° C. (60° C. in Examples 54 and 55 and Comparative Example 28) to carry out a high-speed puncture test (Hydroshot MTH-1 of Shimadzu Corporation, Radical of the support stand: 12.8 mm, Radical of the punch striker: 6.4 mm) so as to measure breaking energy. Larger breaking energy is more preferred.

(4) Thermal Stability (i) Measurement of Molecular Weight Loss (ΔMv)

The viscosity average molecular weight ($M^o$) of the obtained pellet was measured by the method described herein. Then, the pellet was dried with a hot air drier at 120° C. for 6 hours and molded into a plate having a thickness of 2 mm (length of 40 mm, width of 50 mm) with an injection molding machine (SG-150U of Sumitomo Heavy Industries, Ltd.) at a cylinder temperature of 290° C. (240° C. in Examples 54 and 55 and Comparative Example 28) and a mold temperature of 80° C. (60° C. in Examples 54 and 55 and Comparative Example 28). After the above molded plate was molded with 20 shots continuously, an injection cylinder was retreated to keep the molten resin in the cylinder for 10 minutes while the weighing of the resin was completed. After the residence, molding of 4 shots was carried out under the same conditions. The molded plate of the resin composition kept in the cylinder was manufactured by the above molding in order to measure its viscosity average molecular weight ($M^{10}$) by the method described herein.

The value obtained by subtracting the molecular weight ($M^{10}$) after residence from the molecular weight ($M^0$) of the pellet was evaluated as ΔMv. It can be said that as ΔMv becomes smaller, thermal stability becomes higher.

(ii) Evaluation of Discoloration (b Value)

The obtained pellet was dried with a hot air drier at 120° C. for 6 hours and molded into a plate having a thickness of 2 mm (length of 40 mm, width of 50 mm) with an injection molding machine (SG-150U of Sumitomo Heavy Industries, Ltd.) at a cylinder temperature of 290° C. (240° C. in Examples 54 and 55 and Comparative Example 28) and a mold temperature of 80° C. (60° C. in Examples 54 and 55 and Comparative Example 28). 10 shots of the resin right after purge were thrown away and an 11-th shot was used for the evaluation of color. The b value of the molded plate having a thickness of 2 mm was measured by a color computer (TC-1800MK-II: Tokyo Denshoku Co., Ltd.). Since the yellow tinge becomes stronger as the b value becomes larger, the molded product looked greatly discolored when it was observed with eyes. Therefore, a smaller b value is more preferred.

(5) Hydrolysis Resistance (ΔMv)

The obtained pellet was dried with a hot air drier at 120° C. for 6 hours and molded into a plate having a thickness of 2 mm (length of 40 mm, width of 50 mm) with an injection molding machine (SG-150U of Sumitomo Heavy Industries, Ltd.) at a cylinder temperature of 290° C. (240° C. in Examples 54 and 55 and Comparative Example 28) and a mold temperature of 80° C. (60° C. in Examples 54 and 55 and Comparative Example 28). 10 shots of the resin right after purge were thrown away and an 11-th shot was used for the evaluation of hydrolysis resistance. A pressure cooker (pc-305III/V pressure cooker manufactured by Hirayama Mfg. Co., Ltd.) was used to carry out a hydrolysis resistance test under specific treating conditions (treating temperature: 120° C., treating humidity: 100%, treating time: 48 hours (24 hours in Examples 54 and 55 and Comparative Example 28)) to measure the viscosity average molecular weight ($M^a$) of the molded product after the treatment by the method described herein. Meanwhile, the viscosity average molecular weight ($M^b$) of the molded product before the treatment was measured likewise. The value ($M^b - M^a$) obtained by subtracting the molecular weight after the treatment from the molecular weight before the treatment was evaluated as ΔMv. It can be said that as ΔMv becomes smaller, hydrolysis resistance becomes higher.

(6) Measurement of Metal Ions Contained in Mixture (Component B)

About 0.1 g of the mixture (component B) was weighed and placed into a quartz vessel, 5 ml of nitric acid was put into the vessel, and the vessel was sealed up to carry out decomposition by the application of microwaves (MULTIWAVE of Anton Paar Co., Ltd.) (Polytetrafluoroethylene was not decomposed at this point.). After decomposition, polytetrafluoroethylene was taken out and rinsed with super pure water, the decomposition solution was added to the rinsing liquid, and 50 ml of a solution was prepared by adding super pure water. The prepared solution was suitably diluted to prepare a sample solution. The quantitative analysis of sodium metal ion and potassium metal ion contained in the sample solution was carried out by inductively-coupled plasma source mass spectrometry (ICP-MS) (Agilent7500cs of Yokokawa Anality Systems Co., Ltd.) to calculate their concentrations per weight of the sample.

Examples 1 to 56 and Comparative Examples 1 to 29

An aromatic polycarbonate resin powder manufactured from bisphenol A and phosgene by interfacial polycondensation was added to additives and thermoplastic resins shown in Tables 1 to 7 in ratios shown in Tables 1 to 7, mixed with them by a blender and melt kneaded by a vented double-screw extruder (TEX30α of The Japan Steel Works, Ltd.) (completely interlocking type, unidirectional rotation, double screws) to obtain a pellet. A pre-mixture of the aromatic polycarbonate resin powder and the additives having 10 times concentration was prepared by a Henschel mixer and then mixed all together by a blender. The extrusion conditions were a delivery rate of 20 kg/h, a screw revolution of 150 rpm, and a vent vacuum degree of 3 kPa, and the extrusion temperature from the first feed port to the dice was 260° C. (250° C. in Examples 54 and 55 and Comparative Example 28).

The obtained pellet was dried with a hot air circulating drier at 120° C. for 6 hours and molded into a test sample and an impact test sample, both having a length of 40 mm, a width of 50 mm and a thickness of 2 mm, by an injection molding machine at a cylinder temperature of 290° C. (240° C. in Examples 54 and 55 and Comparative Example 28), a mold temperature of 80° C. (60° C. in Examples 54 and 55 and Comparative Example 28) and an injection speed of 50 mm/sec at the same time. The SG-150U injection molding machine of Sumitomo Heavy Industries, Ltd. was used. The evaluation results of the obtained molded plates are shown in Tables 1 to 7.

The components shown in Tables 1 to 7 are given below.

(component A)

PC-1: linear aromatic polycarbonate resin powder synthesized from bisphenol A, p-tert-butylphenol as a terminal capping agent and phosgene by interfacial polycondensation (Panlite L-1225WP (trade name) of Teijin Chemicals Ltd., viscosity average molecular weight of 22,400)

PC-2: linear aromatic polycarbonate resin powder synthesized from bisphenol A, p-tert-butylphenol as a terminal capping agent and phosgene by interfacial polycondensation (L-1225WX (trade name) of Teijin Chemicals Ltd., viscosity average molecular weight of 19,700)

PC-3: aromatic polycarbonate resin pellet obtained from a melt ester interchange reaction between bisphenol A and diphenyl carbonate, having a branch bond component content of about 0.1 mol % of the total of all the recurring units (viscosity average molecular weight of 22,500, the content of the branch bond component was measured by $^1$-H-NMR and that of the aromatic polycarbonate resin PC-1 measured similarly was 0 mol % (no corresponding peak))

PC-4: linear aromatic polycarbonate resin powder synthesized from bisphenol A, p-tert-butylphenol as a terminal capping agent and phosgene by interfacial polycondensation (CM-1000 (trade name) of Teijin Chemicals Ltd., viscosity average molecular weight of 16,000)

(Component B)

B-1: POLY TS AD001 (trade name) (manufactured by PIC Co., Ltd., mixture of polytetrafluoroethylene particles and styrene-acrylonitrile copolymer particles manufactured by suspension polymerization (polytetrafluoroethylene content of 50 wt %)) (sodium metal ion: 3.5 ppm, potassium metal ion: 2.6 ppm)

(Component B for Comparison)
B-2: Blendex449 (trade name) (manufactured by Cronpton Co., Ltd., a mixture of polytetrafluoroethylene particles and styrene-acrylonitrile copolymer particles manufactured by emulsion polymerization (polytetrafluoroethylene content of 50 wt %)) (sodium metal ion: 19 ppm, potassium metal ion: 31 ppm)
B-3: Polyfuron MPA FA500 (trade name) (Daikin Industries, Ltd., polytetrafluoroethylene) (sodium metal ion: 0.1 ppm or less, potassium metal ion: 0.1 ppm or less)
(Component C)
C-1: Megafac F-114P (trade name) (manufactured by Dainippon Ink and Chemicals, Inc., potassium perfluorobutanesulfonate)
C-2: phosphate essentially composed of bisphenol A bis (diphenylphosphate) (CR-741 (trade name) of Daihachi Chemical Industry Co., Ltd.)
C-3: halogen-based flame retardant (aromatic polycarbonate oligomer obtained from tetrabromobisphenol A) (Fire Guard FG-7000 (trade name) of Teijin Chemicals, Ltd.)
(Component D)
D-1: ECS-03T-511 (trade name) (glass fiber manufactured by Nippon Electric Glass Co., Ltd., diameter of 13 μm, cut length of 3 mm)
D-2: PEF-301S (trade name) (glass milled fiber of Nitto Boseki Co., Ltd., diameter of 9 μm, number average fiber length of 30 μm)
D-3: Upn HS-T0.8 (trade name) (talc of Hayashi Kasei Kogyo Co., Ltd., lamellar, average particle diameter of 2 μm)

(Component E)
E-1: SXH330 (trade name) (ABS resin of Nippon A&L Co., Ltd., butadiene rubber content of about 18 wt %, emulsion polymerization product)
E-2: AT-08 (trade name) (ABS resin of Nippon A&L co., Ltd., butadiene rubber content of about 18 wt %, bulk polymerization product)
E-3: 700FP (trade name) (polybutylene terephthalate resin of Wintech Polymer Co., Ltd.)
E-4: TR8580 (trade name) (polyethylene terephthalate resin of Teijin Corporation)
E-5: core-shell graft copolymer (Metabrene C-223A of Mitsubishi Rayon Co., Ltd., graft copolymer comprising 70 wt % of polybutadien as core, and stylene and methyl methacrylate as shell, average rubber particle diameter of 270 nm)
(Others)
SL: Rikemarl SL900 (trade name) (saturated fatty acid ester-based release agent manufactured by Riken Vitamin Co., Ltd.)
EW: Rikestar EW-400 (trade name) (fatty acid ester-based release agent essentially composed of pentaerythritol tetrastearate, manufactured by Riken Vitamin Co., Ltd.)
TMP: TMP (trade name) (phosphorus-based stabilizer manufactured by Daihachi Chemical Industry Co., Ltd.)
AY: AY43-048 (trade name) (isobutyl trimethoxysilane manufactured by Toray Dow Corning Co., Ltd.)
IRGX: phenolic heat stabilizer (IRGANOX1076 (trade name) of Ciba Specialty Chemicals K.K.)

TABLE 1

|  |  |  | unit | Ex. 1 | Ex. 2 | Ex. 3 | Ex. 4 | Ex. 5 | Ex. 6 |
|---|---|---|---|---|---|---|---|---|---|
| Composition | Component A | PC-1 | parts by weight | 99.86 | 99.8 | 90 | 80 | 99.78 | 90 |
|  |  | PC-2 |  |  |  |  |  |  |  |
|  |  | PC-3 |  |  |  |  |  |  |  |
|  |  | PC-4 |  |  |  |  | 9.8 | 19.8 |  | 9.78 |
|  | Component B | B-1 |  | 0.09 | 0.15 | 0.15 | 0.15 | 0.17 | 0.17 |
|  | Component B for comparison | B-2 |  |  |  |  |  |  |  |
|  |  | B-3 |  |  |  |  |  |  |  |
|  | Component C | C-1 | parts by weight | 0.05 | 0.05 | 0.05 | 0.05 | 0.05 | 0.05 |
|  | Total |  |  | 100 | 100 | 100 | 100 | 100 | 100 |
|  | Others | SL | parts by weight | 0.2 | 0.2 | 0.2 | 0.2 | 0.2 | 0.2 |
| Physical properties | Thermal stability | ΔMv | — | 100 | 100 | 100 | 100 | 100 | 100 |
|  |  | b value | — | 2 | 2 | 2 | 2 | 2 | 2 |
|  | Evaluation of appearance |  | — | ◯ | ◯ | ◯ | ◯ | ◯ | ◯ |
|  | Impact strength | Sharpy impact strength | KJ/m² | 17 | 17 | 14 | 13 | 17 | 14 |
|  |  | High-speed puncture strength | J | 47 | 47 | 45 | 43 | 46 | 45 |
|  | Hydrolysis resistance | ΔMv | — | 600 | 600 | 600 | 500 | 600 | 700 |
|  | Flame retardancy | 1.6 mmt | — | V-2 | V-2 | V-2 | V-2 | V-2 | V-2 |
|  |  | 2.4 mmt | — | V-0 | V-0 | V-0 | V-0 | V-0 | V-0 |

|  |  |  | unit | Ex. 7 | Ex. 8 | Ex. 9 | Ex. 10 | Ex. 11 | Ex. 12 |
|---|---|---|---|---|---|---|---|---|---|
| Composition | Component A | PC-1 | parts by weight | 80 | 99.76 | 90 | 80 |  | 99.35 |
|  |  | PC-2 |  |  |  |  |  | 99.75 |  |
|  |  | PC-3 |  |  |  |  |  |  |  |
|  |  | PC-4 |  | 19.78 |  | 9.76 | 19.76 |  |  |
|  | Component B | B-1 |  | 0.17 | 0.19 | 0.19 | 0.19 | 0.2 | 0.6 |
|  | Component B for comparison | B-2 |  |  |  |  |  |  |  |
|  |  | B-3 |  |  |  |  |  |  |  |
|  | Component C | C-1 | parts by weight | 0.05 | 0.05 | 0.05 | 0.05 | 0.05 | 0.05 |
|  | Total |  |  | 100 | 100 | 100 | 100 | 100 | 100 |
|  | Others | SL | parts by weight | 0.2 | 0.2 | 0.2 | 0.2 | 0.2 | 0.2 |

TABLE 1-continued

| Physical properties | Thermal stability | ΔMv | — | 100 | 100 | 100 | 100 | 100 | 100 |
|---|---|---|---|---|---|---|---|---|---|
| | | b value | — | 2 | 2 | 2 | 2 | 2 | 2 |
| | Evaluation of appearance | | — | ○ | ○ | ○ | ○ | ○ | ○ |
| | Impact strength | Sharpy impact strength | KJ/m² | 13 | 17 | 13 | 12 | 17 | 17 |
| | | High-speed puncture strength | J | 43 | 46 | 43 | 42 | 45 | 43 |
| | Hydrolysis resistance | ΔMv | — | 600 | 700 | 800 | 700 | 700 | 800 |
| | Flame retardancy | 1.6 mmt | — | V-2 | V-2 | V-2 | V-2 | V-2 | V-2 |
| | | 2.4 mmt | — | V-0 | V-0 | V-0 | V-0 | V-0 | V-0 |

Ex.: Example

TABLE 2

| | | | unit | Ex. 13 | Ex. 14 | Ex. 15 |
|---|---|---|---|---|---|---|
| Composition | Component A | PC-1 | parts by weight | 99.15 | 99.1 | 98.95 |
| | | PC-2 | | | | |
| | | PC-3 | | | | |
| | | PC-4 | | | | |
| | Component B | B-1 | | 0.8 | 0.8 | 1 |
| | Component B for comparison | B-2 | | | | |
| | | B-3 | | | | |
| | Component C | C-1 | parts by weight | 0.05 | 0.1 | 0.05 |
| | Total | | | 100 | 100 | 100 |
| | Others | SL | parts by weight | 0.2 | 0.2 | 0.2 |
| Physical properties | Thermal stability | ΔMv | — | 100 | 200 | 100 |
| | | b value | — | 4 | 4 | 4 |
| | Evaluation of appearance | | — | ○ | ○ | ○ |
| | Impact strength | Sharpy impact strength | KJ/m² | 17 | 16 | 16 |
| | | High-speed puncture strength | J | 43 | 42 | 43 |
| | Hydrolysis resistance | ΔMv | — | 900 | 1200 | 900 |
| | Flame retardancy | 1.6 mmt | — | V-0 | V-0 | V-0 |
| | | 2.4 mmt | — | V-0 | V-0 | V-0 |

| | | | unit | C. Ex. 1 | C. Ex. 2 | C. Ex. 3 | C. Ex. 4 |
|---|---|---|---|---|---|---|---|
| Composition | Component A | PC-1 | parts by weight | 99.15 | 99.1 | 98.95 | 99.55 |
| | | PC-2 | | | | | |
| | | PC-3 | | | | | |
| | | PC-4 | | | | | |
| | Component B | B-1 | | | | | |
| | Component B for comparison | B-2 | | 0.8 | 0.8 | 1 | |
| | | B-3 | | | | | 0.4 |
| | Component C | C-1 | parts by weight | 0.05 | 0.1 | 0.05 | 0.05 |
| | Total | | | 100 | 100 | 100 | 100 |
| | Others | SL | parts by weight | 0.2 | 0.2 | 0.2 | 0.2 |
| Physical properties | Thermal stability | ΔMv | — | 100 | 200 | 100 | 100 |
| | | b value | — | 8 | 8 | 9 | 4 |
| | Evaluation of appearance | | — | ○ | ○ | ○ | X |
| | Impact strength | Sharpy impact strength | KJ/m² | 17 | 17 | 16 | 14 |
| | | High-speed puncture strength | J | 43 | 42 | 44 | 37 |
| | Hydrolysis resistance | ΔMv | — | 1900 | 2300 | 2000 | 1300 |
| | Flame retardancy | 1.6 mmt | — | V-0 | V-0 | V-0 | V-0 |
| | | 2.4 mmt | — | V-0 | V-0 | V-0 | V-0 |

TABLE 2-continued

|  |  |  | unit | Ex. 16 | Ex. 17 | Ex. 18 | C. Ex. 5 | C. Ex. 6 |
|---|---|---|---|---|---|---|---|---|
| Composition | Component A | PC-1 | parts by weight | 99.15 | 99.15 |  | 99.15 | 99.55 |
|  |  | PC-2 |  |  |  |  |  |  |
|  |  | PC-3 |  |  |  | 99.15 |  |  |
|  |  | PC-4 |  |  |  |  |  |  |
|  | Component B | B-1 |  | 0.6 | 0.8 | 0.8 |  |  |
|  | Component B for comparison | B-2 |  |  |  |  | 0.8 |  |
|  |  | B-3 |  |  |  |  |  | 0.4 |
|  | Component C | C-1 | parts by weight | 0.05 | 0.05 | 0.05 | 0.05 | 0.05 |
|  | Total |  |  | 100 | 100 | 100 | 100 | 100 |
|  | Others | SL | parts by weight | 0.2 | 0.2 | 0.2 | 0.2 | 0.2 |
| Physical properties | Thermal stability | ΔMv | — | 100 | 100 | 300 | 100 | 100 |
|  |  | b value | — | 4 | 4 | 5 | 8 | 4 |
|  | Evaluation of appearance |  | — | ○ | ○ | ○ | ○ | X |
|  | Impact strength | Sharpy impact strength | KJ/m$^2$ | 13 | 13 | 15 | 13 | 10 |
|  |  | High-speed puncture strength | J | 37 | 37 | 40 | 38 | 34 |
|  | Hydrolysis resistance | ΔMv | — | 900 | 1000 | 1100 | 2100 | 1500 |
|  | Flame retardancy | 1.6 mmt | — | V-0 | V-0 | V-0 | V-0 | V-0 |
|  |  | 2.4 mmt | — | V-0 | V-0 | V-0 | V-0 | V-0 |

Ex.: Example
C. Ex.: Comparative Example

TABLE 3

|  |  |  | unit | Ex. 19 | Ex. 20 | Ex. 21 | Ex. 22 |
|---|---|---|---|---|---|---|---|
| Composition | Component A | PC-1 | parts by weight | 99.35 | 99.15 | 99.15 | 99.15 |
|  |  | PC-2 |  |  |  |  |  |
|  |  | PC-3 |  |  |  |  |  |
|  |  | PC-4 |  |  |  |  |  |
|  | Component B | B-1 |  | 0.6 | 0.8 | 0.8 | 0.8 |
|  | Component B for comparison | B-2 |  |  |  |  |  |
|  |  | B-3 |  |  |  |  |  |
|  | Component C | C-1 |  | 0.05 | 0.05 | 0.05 | 0.05 |
|  | Total |  |  | 100 | 100 | 100 | 100 |
|  | Component D | D-1 | parts by weight | 10 | 10 | 20 |  |
|  |  | D-2 |  |  |  | 10 |  |
|  |  | D-3 |  |  |  |  | 15 |
|  | Others | SL | parts by weight | 0.2 | 0.2 | 0.2 | 0.2 |
|  |  | TMP |  | 0.02 | 0.02 | 0.02 |  |
|  |  | AY |  |  |  |  | 0.4 |
| Physical properties | Thermal stability | ΔMv | — | 600 | 600 | 1200 | 800 |
|  |  | b value | — | 5 | 5 | 9 | −4 |
|  | Evaluation of appearance |  | — | ○ | ○ | ○ | ○ |
|  | Impact strength | Sharpy impact strength | KJ/m$^2$ | 7 | 7 | 7 | 22 |
|  |  | High-speed puncture strength | J | 14 | 14 | 9 | 28 |
|  | Hydrolysis resistance | ΔMv | — | 1000 | 1100 | 1300 | 1000 |
|  | Flame retardancy | 1.6 mmt | — | V-0 | V-0 | V-0 | V-0 |
|  |  | 2.4 mmt | — | V-0 | V-0 | V-0 | V-0 |

|  |  |  | unit | C. Ex. 7 | C. Ex. 8 | C. Ex. 9 | C. Ex. 10 |
|---|---|---|---|---|---|---|---|
| Composition | Component A | PC-1 | parts by weight | 99.15 | 99.15 | 99.15 | 99.55 |
|  |  | PC-2 |  |  |  |  |  |
|  |  | PC-3 |  |  |  |  |  |
|  |  | PC-4 |  |  |  |  |  |
|  | Component B | B-1 |  |  |  |  |  |
|  | Component B for comparison | B-2 |  | 0.8 | 0.8 | 0.8 |  |
|  |  | B-3 |  |  |  |  | 0.4 |
|  | Component C | C-1 |  | 0.05 | 0.05 | 0.05 | 0.05 |
|  | Total |  |  | 100 | 100 | 100 | 100 |

TABLE 3-continued

|  |  |  | | | | | |
|---|---|---|---|---|---|---|---|
| | Component D | D-1 | parts | 10 | 20 | | 10 |
| | | D-2 | by | | 10 | | |
| | | D-3 | weight | | | 15 | |
| | Others | SL | parts | 0.2 | 0.2 | 0.2 | 0.2 |
| | | TMP | by | 0.02 | 0.02 | | 0.02 |
| | | AY | weight | | | 0.4 | |
| Physical properties | Thermal stability | ΔMv | — | 600 | 1200 | 800 | 600 |
| | | b value | — | 7 | 12 | −2 | 5 |
| | Evaluation of appearance | | — | ○ | ○ | ○ | X |
| | Impact strength | Sharpy impact strength | KJ/m² | 7 | 7 | 22 | 6 |
| | | High-speed puncture strength | J | 14 | 9 | 28 | 12 |
| | Hydrolysis resistance | ΔMv | — | 2100 | 2500 | 1800 | 1400 |
| | Flame retardancy | 1.6 mmt | — | V-0 | V-0 | V-0 | V-0 |
| | | 2.4 mmt | — | V-0 | V-0 | V-0 | V-0 |

|  |  |  | unit | Ex. 23 | Ex. 24 | Ex. 25 | C. Ex. 11 | C. Ex. 12 |
|---|---|---|---|---|---|---|---|---|
| Composition | Component A | PC-1 | parts by weight | | | | | |
| | | PC-2 | | 99.15 | | | 99.15 | 99.55 |
| | | PC-3 | | | 99.15 | | | |
| | | PC-4 | | | | 99.15 | | |
| | Component B | B-1 | | 0.8 | 0.8 | 0.8 | | |
| | Component B for comparison | B-2 | | | | | 0.8 | |
| | | B-3 | | | | | | 0.4 |
| | Component C | C-1 | | 0.05 | 0.05 | 0.05 | 0.05 | 0.05 |
| | | Total | | 100 | 100 | 100 | 100 | 100 |
| | Component D | D-1 | parts by weight | 10 | 10 | 10 | 10 | 10 |
| | | D-2 | | | | | | |
| | | D-3 | | | | | | |
| | Others | SL | parts by weight | 0.2 | 0.2 | 0.2 | 0.2 | 0.2 |
| | | TMP | | 0.02 | 0.02 | 0.02 | 0.02 | 0.02 |
| | | AY | | | | | | |
| Physical properties | Thermal stability | ΔMv | — | 600 | 800 | 900 | 600 | 600 |
| | | b value | — | 5 | 6 | 8 | 7 | 5 |
| | Evaluation of appearance | | — | ○ | ○ | ○ | ○ | X |
| | Impact strength | Sharpy impact strength | KJ/m² | 5 | 6 | 6 | 5 | 4 |
| | | High-speed puncture strength | J | 12 | 14 | 14 | 13 | 10 |
| | Hydrolysis resistance | ΔMv | — | 1200 | 1300 | 1500 | 2200 | 1500 |
| | Flame retardancy | 1.6 mmt | — | V-0 | V-0 | V-0 | V-0 | V-0 |
| | | 2.4 mmt | — | V-0 | V-0 | V-0 | V-0 | V-0 |

Ex. Example
C. Ex. Comparative Example

TABLE 4

|  |  |  | unit | Ex. 26 | Ex. 27 | Ex. 28 | Ex. 29 |
|---|---|---|---|---|---|---|---|
| Composition | Component A | PC-1 | parts by weight | 99.85 | 99.79 | 90 | 80 |
| | | PC-2 | | | | | |
| | | PC-3 | | | | | |
| | | PC-4 | | | | 9.79 | 19.79 |
| | Component B | B-1 | | 0.1 | 0.16 | 0.16 | 0.16 |
| | Component B for comparison | B-2 | | | | | |
| | | B-3 | | | | | |
| | Component C | C-1 | | 0.05 | 0.05 | 0.05 | 0.05 |
| | | Total | | 100 | 100 | 100 | 100 |
| | Others | SL | parts by weight | 0.2 | 0.2 | 0.2 | 0.2 |
| | | EW | | | | | |
| Physical properties | Thermal stability | ΔMv | — | 100 | 100 | 100 | 100 |
| | | b value | — | 3 | 3 | 3 | 3 |
| | Evaluation of appearance | | — | ○ | ○ | ○ | ○ |
| | Impact strength | Sharpy impact strength | KJ/m² | 16 | 16 | 13 | 12 |
| | | High-speed puncture strength | J | 46 | 46 | 44 | 42 |

TABLE 4-continued

|  |  |  | unit |  |  |  |  |
|---|---|---|---|---|---|---|---|
|  | Hydrolysis resistance | ΔMv | — | 500 | 600 | 600 | 500 |
|  | Flame retardancy | 1.6 mmt | — | V-2 | V-2 | V-2 | V-2 |
|  |  | 2.4 mmt | — | V-0 | V-0 | V-0 | V-0 |

|  |  |  | unit | Ex. 30 | Ex. 31 | Ex. 32 | Ex. 33 |
|---|---|---|---|---|---|---|---|
| Composition | Component A | PC-1 | parts by weight | 99.77 | 90 | 80 | 99.75 |
|  |  | PC-2 |  |  |  |  |  |
|  |  | PC-3 |  |  |  |  |  |
|  |  | PC-4 |  |  | 9.77 | 19.77 |  |
|  | Component B | B-1 |  | 0.18 | 0.18 | 0.18 | 0.2 |
|  | Component B for comparison | B-2 |  |  |  |  |  |
|  |  | B-3 |  |  |  |  |  |
|  | Component C | C-1 |  | 0.05 | 0.05 | 0.05 | 0.05 |
|  |  | Total |  | 100 | 100 | 100 | 100 |
|  | Others | SL | parts by weight | 0.2 | 0.2 | 0.2 | 0.2 |
|  |  | EW |  |  |  |  |  |
| Physical properties | Thermal stability | ΔMv | — | 100 | 100 | 100 | 100 |
|  |  | b value | — | 3 | 3 | 3 | 3 |
|  |  | Evaluation of appearance | — | ○ | ○ | ○ | ○ |
|  | Impact strength | Sharpy impact strength | KJ/m$^2$ | 16 | 13 | 12 | 16 |
|  |  | High-speed puncture strength | J | 44 | 44 | 42 | 44 |
|  | Hydrolysis resistance | ΔMv | — | 600 | 700 | 600 | 700 |
|  | Flame retardancy | 1.6 mmt | — | V-2 | V-2 | V-2 | V-2 |
|  |  | 2.4 mmt | — | V-0 | V-0 | V-0 | V-0 |

|  |  |  | unit | Ex. 34 | Ex. 35 | Ex. 36 | Ex. 37 |
|---|---|---|---|---|---|---|---|
| Composition | Component A | PC-1 | parts by weight | 90 | 80 |  | 99.4 |
|  |  | PC-2 |  |  |  |  |  |
|  |  | PC-3 |  |  |  | 99.75 |  |
|  |  | PC-4 |  | 9.75 | 19.75 |  |  |
|  | Component B | B-1 |  | 0.2 | 0.2 | 0.2 | 0.55 |
|  | Component B for comparison | B-2 |  |  |  |  |  |
|  |  | B-3 |  |  |  |  |  |
|  | Component C | C-1 |  | 0.05 | 0.05 | 0.05 | 0.05 |
|  |  | Total |  | 100 | 100 | 100 | 100 |
|  | Others | SL | parts by weight | 0.2 | 0.2 | 0.2 | 0.2 |
|  |  | EW |  |  |  |  |  |
| Physical properties | Thermal stability | ΔMv | — | 100 | 100 | 100 | 100 |
|  |  | b value | — | 3 | 3 | 3 | 4 |
|  |  | Evaluation of appearance | — | ○ | ○ | ○ | ○ |
|  | Impact strength | Sharpy impact strength | KJ/m$^2$ | 13 | 12 | 17 | 17 |
|  |  | High-speed puncture strength | J | 43 | 42 | 45 | 44 |
|  | Hydrolysis resistance | ΔMv | — | 800 | 700 | 700 | 800 |
|  | Flame retardancy | 1.6 mmt | — | V-2 | V-2 | V-2 | V-0 |
|  |  | 2.4 mmt | — | V-0 | V-0 | V-0 | V-0 |

|  |  |  | unit | Ex. 38 | Ex. 39 | Ex. 40 | Ex. 41 |
|---|---|---|---|---|---|---|---|
| Composition | Component A | PC-1 | parts by weight | 99.15 | 99.17 | 99.1 | 99 |
|  |  | PC-2 |  |  |  |  |  |
|  |  | PC-3 |  |  |  |  |  |
|  |  | PC-4 |  |  |  |  |  |
|  | Component B | B-1 |  | 0.8 | 0.78 | 0.8 | 0.95 |
|  | Component B for comparison | B-2 |  |  |  |  |  |
|  |  | B-3 |  |  |  |  |  |
|  | Component C | C-1 |  | 0.05 | 0.05 | 0.1 | 0.05 |
|  |  | Total |  | 100 | 100 | 100 | 100 |
|  | Others | SL | parts by weight |  | 0.2 |  | 0.2 |
|  |  | EW |  | 0.2 |  | 0.2 |  |
| Physical properties | Thermal stability | ΔMv | — | 100 | 100 | 200 | 100 |
|  |  | b value | — | 4 | 4 | 4 | 4 |

TABLE 4-continued

|  |  |  | | | | | |
|---|---|---|---|---|---|---|---|
|  | Evaluation of appearance |  | — | ○ | ○ | ○ | ○ |
| Impact strength | Sharpy impact strength | KJ/m$^2$ |  | 17 | 17 | 16 | 16 |
|  | High-speed puncture strength | J |  | 43 | 44 | 42 | 42 |
| Hydrolysis resistance | ΔMv |  | — | 700 | 900 | 1000 | 900 |
| Flame retardancy | 1.6 mmt |  | — | V-0 | V-0 | V-0 | V-0 |
|  | 2.4 mmt |  | — | V-0 | V-0 | V-0 | V-0 |

Ex.: Example

TABLE 5

|  |  |  | unit | C. Ex. 13 | C. Ex. 14 | C. Ex. 15 |
|---|---|---|---|---|---|---|
| Composition | Component A | PC-1 | parts by weight |  | 99.17 | 99.15 |
|  |  | PC-2 |  | 99.75 |  |  |
|  |  | PC-3 |  |  |  |  |
|  |  | PC-4 |  |  |  |  |
|  | Component B | B-1 |  |  |  |  |
|  | Component B for comparison | B-2 |  | 0.2 | 0.78 | 0.8 |
|  |  | B-3 |  |  |  |  |
|  | Component C | C-1 |  | 0.05 | 0.05 | 0.05 |
|  |  | Total |  | 100 | 100 | 100 |
|  | Others | SL | parts by weight | 0.2 | 0.2 |  |
|  |  | EW |  |  |  | 0.2 |
| Physical properties | Thermal stability | ΔMv | — | 200 | 100 | 100 |
|  |  | b value | — | 5 | 8 | 8 |
|  | Evaluation of appearance |  | — | ○ | ○ | ○ |
| Impact strength | Sharpy impact strength | KJ/m$^2$ |  | 17 | 17 | 17 |
|  | High-speed puncture strength | J |  | 45 | 44 | 42 |
| Hydrolysis resistance | ΔMv |  | — | 1500 | 1900 | 2000 |
| Flame retardancy | 1.6 mmt |  | — | V-2 | V-0 | V-0 |
|  | 2.4 mmt |  | — | V-0 | V-0 | V-0 |

|  |  |  | unit | C. Ex. 16 | C. Ex. 17 | C. Ex. 18 |
|---|---|---|---|---|---|---|
| Composition | Component A | PC-1 | parts by weight | 99.1 | 99 | 99.55 |
|  |  | PC-2 |  |  |  |  |
|  |  | PC-3 |  |  |  |  |
|  |  | PC-4 |  |  |  |  |
|  | Component B | B-1 |  |  |  |  |
|  | Component B for comparison | B-2 |  | 0.8 | 0.95 |  |
|  |  | B-3 |  |  |  |  |
|  | Component C | C-1 |  | 0.1 | 0.05 | 0.05 |
|  |  | Total |  | 100 | 100 | 100 |
|  | Others | SL | parts by weight |  | 0.2 |  |
|  |  | EW |  | 0.2 |  | 0.2 |
| Physical properties | Thermal stability | ΔMv | — | 200 | 100 | 100 |
|  |  | b value | — | 8 | 9 | 4 |
|  | Evaluation of appearance |  | — | ○ | ○ | X |
| Impact strength | Sharpy impact strength | KJ/m$^2$ |  | 17 | 16 | 14 |
|  | High-speed puncture strength | J |  | 42 | 44 | 37 |
| Hydrolysis resistance | ΔMv |  | — | 2100 | 2000 | 1100 |
| Flame retardancy | 1.6 mmt |  | — | V-0 | V-0 | V-0 |
|  | 2.4 mmt |  | — | V-0 | V-0 | V-0 |

|  |  |  | unit | Ex. 42 | Ex. 43 | Ex. 44 |
|---|---|---|---|---|---|---|
| Composition | Component A | PC-1 | parts by weight |  |  |  |
|  |  | PC-2 |  | 99.4 | 99.15 |  |
|  |  | PC-3 |  |  |  | 99.15 |
|  |  | PC-4 |  |  |  |  |

TABLE 5-continued

|  |  |  |  |  |  |  |
|---|---|---|---|---|---|---|
|  | Component B | B-1 |  | 0.55 | 0.8 | 0.8 |
|  | Component B | B-2 |  |  |  |  |
|  | for | B-3 |  |  |  |  |
|  | comparison |  |  |  |  |  |
|  | Component C | C-1 |  | 0.05 | 0.05 | 0.05 |
|  |  | Total |  | 100 | 100 | 100 |
|  | Others | SL | parts | 0.2 |  |  |
|  |  | EW | by |  | 0.2 | 0.2 |
|  |  |  | weight |  |  |  |
| Physical | Thermal | ΔMv | — | 100 | 100 | 300 |
| properties | stability | b value |  | 4 | 4 | 5 |
|  |  | Evaluation of appearance | — | ◯ | ◯ | ◯ |
|  | Impact | Sharpy impact | KJ/m² | 13 | 13 | 15 |
|  | strength | strength |  |  |  |  |
|  |  | High-speed puncture | J | 38 | 37 | 40 |
|  |  | strength |  |  |  |  |
|  | Hydrolysis | ΔMv | — | 900 | 900 | 1000 |
|  | resistance |  |  |  |  |  |
|  | Flame | 1.6 mmt | — | V-2 | V-0 | V-0 |
|  | retardancy | 2.4 mmt | — | V-0 | V-0 | V-0 |

|  |  |  | unit | C. Ex. 19 | C. Ex. 20 |
|---|---|---|---|---|---|
| Composition | Component A | PC-1 | parts |  |  |
|  |  | PC-2 | by | 99.15 | 99.55 |
|  |  | PC-3 | weight |  |  |
|  |  | PC-4 |  |  |  |
|  | Component B | B-1 |  |  |  |
|  | Component B | B-2 |  | 0.8 |  |
|  | for | B-3 |  |  | 0.4 |
|  | comparison |  |  |  |  |
|  | Component C | C-1 |  | 0.05 | 0.05 |
|  |  | Total |  | 100 | 100 |
|  | Others | SL | parts |  |  |
|  |  | EW | by | 0.2 | 0.2 |
|  |  |  | weight |  |  |
| Physical | Thermal | ΔMv | — | 100 | 100 |
| properties | stability | b value |  | 8 | 4 |
|  |  | Evaluation of appearance | — | ◯ | X |
|  | Impact | Sharpy impact | KJ/m² | 13 | 10 |
|  | strength | strength |  |  |  |
|  |  | High-speed puncture | J | 38 | 34 |
|  |  | strength |  |  |  |
|  | Hydrolysis | ΔMv | — | 2000 | 1400 |
|  | resistance |  |  |  |  |
|  | Flame | 1.6 mmt | — | V-0 | V-0 |
|  | retardancy | 2.4 mmt | — | V-0 | V-0 |

C. Ex.: Comparative Example
Ex.: Example

TABLE 6

|  |  |  | unit | Ex. 45 | Ex. 46 | Ex. 47 |
|---|---|---|---|---|---|---|
| Composition | Component A | PC-1 | parts by | 99.15 | 99.15 |  |
|  |  | PC-2 | weight |  |  |  |
|  |  | PC-3 |  |  |  |  |
|  |  | PC-4 |  |  |  | 99.15 |
|  | Component B | B-1 |  | 0.8 | 0.8 | 0.8 |
|  | Component B for | B-2 |  |  |  |  |
|  | comparison | B-3 |  |  |  |  |
|  | Component C | C-1 |  | 0.05 | 0.05 | 0.05 |
|  |  | Total |  | 100 | 100 | 100 |
|  | Component D | D-1 | parts by | 10 | 20 |  |
|  |  | D-2 | weight |  | 10 |  |
|  |  | D-3 |  |  |  | 3 |
|  | Others | SL | parts by |  |  |  |
|  |  | EW | weight | 0.2 | 0.2 | 0.2 |
|  |  | TMP |  | 0.02 | 0.02 |  |
|  |  | AY |  |  |  |  |
| Physical | Thermal | ΔMv | — | 500 | 1100 | 300 |
| properties | stability | b value | — | 5 | 9 | 2 |

TABLE 6-continued

|  |  |  | | | | | |
|---|---|---|---|---|---|---|---|
| | Evaluation of appearance | | — | ○ | ○ | ○ | |
| Impact strength | Sharpy impact strength | | KJ/m² | 7 | 7 | 17 | |
| | High-speed puncture strength | | J | 15 | 10 | 37 | |
| Hydrolysis resistance | ΔMv | | — | 1000 | 1200 | 1000 | |
| Flame retardancy | 1.6 mmt | | — | V-0 | V-0 | V-0 | |
| | 2.4 mmt | | — | V-0 | V-0 | V-0 | |

| | | | unit | Ex. 48 | Ex. 49 | Ex. 50 |
|---|---|---|---|---|---|---|
| Composition | Component A | PC-1 | parts by weight | | | 99.15 |
| | | PC-2 | | 99.15 | 99.15 | |
| | | PC-3 | | | | |
| | | PC-4 | | | | |
| | Component B | B-1 | | 0.8 | 0.8 | 0.8 |
| | Component B for comparison | B-2 | | | | |
| | | B-3 | | | | |
| | Component C | C-1 | | 0.05 | 0.05 | 0.05 |
| | | Total | | 100 | 100 | 100 |
| | Component D | D-1 | parts by weight | | | |
| | | D-2 | | | | |
| | | D-3 | | 5 | 5 | 15 |
| | Others | SL | parts by weight | | 0.2 | |
| | | EW | | 0.2 | | 0.2 |
| | | TMP | | | | |
| | | AY | | | | 0.4 |
| Physical properties | Thermal stability | ΔMv | — | 400 | 500 | 700 |
| | | b value | — | 0 | 0 | −4 |
| | Evaluation of appearance | | — | ○ | ○ | ○ |
| | Impact strength | Sharpy impact strength | KJ/m² | 18 | 18 | 22 |
| | | High-speed puncture strength | J | 33 | 33 | 29 |
| | Hydrolysis resistance | ΔMv | — | 1000 | 1100 | 900 |
| | Flame retardancy | 1.6 mmt | — | V-0 | V-0 | V-0 |
| | | 2.4 mmt | — | V-0 | V-0 | V-0 |

| | | | unit | C. Ex. 21 | C. Ex. 22 | C. Ex. 23 | C. Ex. 24 | C. Ex. 25 |
|---|---|---|---|---|---|---|---|---|
| Composition | Component A | PC-1 | parts by weight | 99.15 | 99.15 | | 99.15 | 99.55 |
| | | PC-2 | | | | 99.15 | | |
| | | PC-3 | | | | | | |
| | | PC-4 | | | | | | |
| | Component B | B-1 | | | | | | |
| | Component B for comparison | B-2 | | 0.8 | 0.8 | 0.8 | 0.8 | |
| | | B-3 | | | | | | 0.4 |
| | Component C | C-1 | | 0.05 | 0.05 | 0.05 | 0.05 | 0.05 |
| | | Total | | 100 | 100 | 100 | 100 | 100 |
| | Component D | D-1 | parts by weight | 10 | 20 | | | 10 |
| | | D-2 | | | 10 | | | |
| | | D-3 | | | | 5 | 15 | |
| | Others | SL | parts by weight | | | | | |
| | | EW | | 0.2 | 0.2 | 0.2 | 0.2 | 0.2 |
| | | TMP | | 0.02 | 0.02 | | | 0.02 |
| | | AY | | | | | 0.4 | |
| Physical properties | Thermal stability | ΔMv | — | 500 | 1100 | 500 | 700 | 500 |
| | | b value | — | 7 | 12 | −2 | −2 | 5 |
| | Evaluation of appearance | | — | ○ | ○ | ○ | ○ | X |
| | Impact strength | Sharpy impact strength | KJ/m² | 7 | 7 | 18 | 22 | 6 |
| | | High-speed puncture strength | J | 15 | 10 | 33 | 29 | 13 |
| | Hydrolysis resistance | ΔMv | — | 2000 | 2400 | 2100 | 1700 | 1300 |
| | Flame retardancy | 1.6 mmt | — | V-0 | V-0 | V-0 | V-0 | V-0 |
| | | 2.4 mmt | — | V-0 | V-0 | V-0 | V-0 | V-0 |

| | | | unit | Ex. 51 | Ex. 52 | Ex. 53 | C. Ex. 26 | C. Ex. 27 |
|---|---|---|---|---|---|---|---|---|
| Composition | Component A | PC-1 | parts by weight | | | | | |
| | | PC-2 | | 99.15 | | | 99.15 | 99.55 |
| | | PC-3 | | | 99.15 | | | |
| | | PC-4 | | | | 99.15 | | |
| | Component B | B-1 | | 0.8 | 0.8 | 0.8 | | |

TABLE 6-continued

|  |  |  |  |  |  |  |  |  |
|---|---|---|---|---|---|---|---|---|
| | Component B for comparison | B-2 | | | | | 0.8 | |
| | | B-3 | | | | | | 0.4 |
| | Component C | C-1 | | 0.05 | 0.05 | 0.05 | 0.05 | 0.05 |
| | | Total | | 100 | 100 | 100 | 100 | 100 |
| | Component D | D-1 | parts by weight | 10 | 10 | 10 | 10 | 10 |
| | | D-2 | | | | | | |
| | | D-3 | | | | | | |
| | Others | SL | parts by weight | | | | | |
| | | EW | | 0.2 | 0.2 | 0.2 | 0.2 | 0.2 |
| | | TMP | | 0.02 | 0.02 | 0.02 | 0.02 | 0.02 |
| | | AY | | | | | | |
| Physical properties | Thermal stability | ΔMv | — | 500 | 700 | 800 | 500 | 500 |
| | | b value | | 5 | 6 | 8 | 7 | 5 |
| | | Evaluation of appearance | — | ○ | ○ | ○ | ○ | X |
| | Impact strength | Sharpy impact strength | KJ/m² | 5 | 6 | 6 | 5 | 4 |
| | | High-speed puncture strength | J | 13 | 15 | 15 | 13 | 11 |
| | Hydrolysis resistance | ΔMv | — | 1100 | 1200 | 1400 | 2100 | 1400 |
| | Flame retardancy | 1.6 mmt | — | V-0 | V-0 | V-0 | V-0 | V-0 |
| | | 2.4 mmt | — | V-0 | V-0 | V-0 | V-0 | V-0 |

Ex.: Example
C. Ex.: Comparative Example

TABLE 7

|  |  |  | unit | Ex. 54 | Ex. 55 | C. Ex. 28 | Ex. 56 | C. Ex. 29 |
|---|---|---|---|---|---|---|---|---|
| Composition | Component A | PC-1 | parts by weight | | | | 89.4 | 89.4 |
| | | PC-2 | | 84.2 | 84.2 | 84.2 | | |
| | Component B | B-1 | | 0.8 | 0.8 | | 0.6 | |
| | | B-2 | | | | 0.8 | | 0.6 |
| | Component C | C-2 | parts by weight | 15 | 15 | 15 | | |
| | | C-3 | | | | | 10 | 10 |
| | | Total | | 100 | 100 | 100 | 100 | 100 |
| | Component D | D-1 | parts by weight | | | | 15 | 15 |
| | | D-2 | | | | | 15 | 15 |
| | | D-3 | | 0.8 | 0.8 | 0.8 | | |
| | Component E | E-1 | parts by weight | 15 | | 15 | | |
| | | E-2 | | | 15 | | | |
| | | E-3 | | | | | 5 | 5 |
| | | E-4 | | | | | 15 | 15 |
| | | E-5 | | 2 | 2 | 2 | | |
| | Others | SL | parts by weight | 0.3 | 0.3 | 0.3 | 0.3 | 0.3 |
| | | IRGX | | 0.15 | 0.15 | 0.15 | | |
| | | TMP | | | | | 0.02 | 0.02 |
| Physical properties | Thermal stability | ΔMv | — | 500 | 400 | 700 | 500 | 700 |
| | | b value | | −2 | −1 | 1 | 4 | 6 |
| | | Evaluation of appearance | — | ○ | ○ | ○ | ○ | ○ |
| | Impact strength | Sharpy impact strength | KJ/m² | 14 | 14 | 14 | 7 | 7 |
| | | High-speed puncture strength | J | 31 | 32 | 30 | 15 | 13 |
| | Hydrolysis resistance | ΔMv | — | 1800 | 1600 | 2300 | 1500 | 1800 |
| | Flame retardancy | 1.6 mmt | — | V-0 | V-0 | V-0 | V-0 | V-0 |
| | | 2.4 mmt | — | V-0 | V-0 | V-0 | V-0 | V-0 |

Ex.: Example
C. Ex.: Comparative Example

As obvious from Tables 1 to 7, the resin composition of the present invention is excellent in flame retardancy, appearance and impact strength as well as thermal stability and hydrolysis resistance. The resin composition of the present invention has a good appearance and a ΔMv in the evaluation of hydrolysis resistance of preferably 1,000 or less, particularly preferably 900 or less when it does not contain a reinforcing filler and preferably 1,400 or less, particularly preferably 1,200 or less when it contains a reinforcing filler.

EFFECT OF THE INVENTION

The resin composition of the present invention is excellent in flame retardancy, appearance and impact strength. Further, the resin composition of the present invention is excellent in thermal stability and hydrolysis resistance.

INDUSTRIAL APPLICABILITY

The resin composition of the present invention is useful in application fields such as electronic and electric appliances, OA equipment, car parts, mechanical parts, agricultural materials, shipping containers, play tools and other miscellaneous goods.

The invention claimed is:

1. A resin composition comprising:
   (A) 75 to 99.98 wt % of an aromatic polycarbonate resin (component A),
   (B) 0.01 to 5 wt % of a mixture comprising polytetrafluoroethylene particles coated with an organic polymer (component B), and
   (C) 0.01 to 20 wt % of a flame retardant (component C),
   wherein the component B is manufactured by suspension polymerization without using an emulsifier, and
   wherein a sodium metal ion content of the component B (excluding any sodium metal ion contained in the polytetrafluoroethylene particles) is 10 ppm or less.

2. The resin composition according to claim 1, wherein a potassium metal ion content of the component B (excluding any potassium metal ion contained in the polytetrafluoroethylene particles) is 15 ppm or less.

3. The resin composition according to claim 1, wherein the component B is manufactured by suspension polymerization of an organic monomer in the presence of polytetrafluoroethylene particles without forming a latex.

4. The resin composition according to claim 1, wherein the polytetrafluoroethylene particles have a diameter of 0.1 to 0.6 μm and a number average molecular weight of $1 \times 10^6$ to $1 \times 10^7$.

5. The resin composition according to claim 1, wherein the organic polymer is a polymer derived from a styrene-based monomer and/or an acrylic monomer.

6. The resin composition according to claim 1, wherein the organic polymer is a styrene-acrylic polymer.

7. The resin composition according to claim 6, wherein the styrene-acrylic polymer is a polymer of a styrene-based monomer (i) and an acrylic monomer (ii), in which the styrene-based monomer (i) may be substituted by at least one group selected from the group consisting of an alkyl group having 1 to 6 carbon atoms, an alkoxy group having 1 to 6 carbon atoms and a halogen atom, and the acrylic monomer (ii) includes a (meth)acrylate derivative which may be substituted by at least one group selected from the group consisting of an alkyl group having 1 to 20 carbon atoms, a cycloalkyl group having 3 to 8 carbon atoms, an aryl group and a glycidyl group.

8. The resin composition according to claim 1, wherein the component C is an organic metal salt-based flame retardant.

9. The resin composition according to claim 8, wherein the organic metal salt-based flame retardant is an alkali (earth) metal salt of an organic sulfonic acid.

10. The resin composition according to claim 1, wherein the component C is a fluorine-containing organic metal salt-based flame retardant.

11. The resin composition according to claim 10, wherein the fluorine-containing organic metal salt-based flame retardant is a metal salt of a perfluoroalkylsulfonic acid.

12. The resin composition according to claim 1, which further comprises 1 to 50 parts by weight of at least one reinforcing filler (component D) selected from the group consisting of a lamellar inorganic filler (component D-1) and a fibrous inorganic filler (component D-2) based on 100 parts by weight of the total amount of the components A, B and C.

13. The resin composition according to claim 12, wherein the component D-1 is talc.

14. The resin composition according to claim 12, wherein the component D-2 is at least one fibrous inorganic filler selected from the group consisting of a glass fiber and a glass short fiber.

15. The resin composition according to claim 1, which further comprises a thermoplastic resin (component E) in an amount of 1 to 50 parts by weight based on 100 parts by weight of the total amount of the components A and E.

16. The resin composition according to claim 15, wherein the component E is a polyester resin and/or an ABS resin.

17. A molded product of the resin composition of claim 1.

* * * * *